United States Patent
Shim et al.

(10) Patent No.: US 10,621,017 B2
(45) Date of Patent: Apr. 14, 2020

(54) METHOD AND DEVICE FOR SHARING A DISK IMAGE BETWEEN OPERATING SYSTEMS

(71) Applicant: Samsung Electronics Co., Ltd., Suwon-si, Gyeonggi-do (KR)

(72) Inventors: Hyo-taek Shim, Yongin-si (KR); Yong-hyeok Lee, Suwon-si (KR); Sung-min Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/744,462

(22) PCT Filed: Jul. 21, 2016

(86) PCT No.: PCT/KR2016/007953
§ 371 (c)(1),
(2) Date: Jan. 12, 2018

(87) PCT Pub. No.: WO2017/014578
PCT Pub. Date: Jan. 26, 2017

(65) Prior Publication Data
US 2018/0203747 A1    Jul. 19, 2018

(30) Foreign Application Priority Data
Jul. 21, 2015 (KR) .................. 10-2015-0103014

(51) Int. Cl.
| *G06F 9/54* | (2006.01) |
| *G06F 3/01* | (2006.01) |
| *G06F 9/44* | (2018.01) |
| *G06F 9/4401* | (2018.01) |

(52) U.S. Cl.
CPC ............. *G06F 9/543* (2013.01); *G06F 3/01* (2013.01); *G06F 9/44* (2013.01); *G06F 9/4406* (2013.01); *G06F 9/4411* (2013.01); *G06F 9/544* (2013.01)

(58) Field of Classification Search
CPC .......................... G06F 9/45533; G06F 9/541
USPC ............................................. 718/1; 719/319
See application file for complete search history.

(56) References Cited

U.S. PATENT DOCUMENTS

| 8,312,184 | B2 | 11/2012 | Ito et al. |
| 8,930,652 | B2 | 1/2015 | Heim |
| 8,935,431 | B2 | 1/2015 | Oehme et al. |
| 8,938,572 | B1 | 1/2015 | Vincent |
| 8,966,474 | B2 * | 2/2015 | Herington ............ G06F 9/45558 718/1 |
| 10,067,777 | B2 * | 9/2018 | Dong ................... G06F 9/45545 |
| 2010/0088699 | A1 | 4/2010 | Sasaki |

(Continued)

FOREIGN PATENT DOCUMENTS

| JP | 2008-084029 A | 4/2008 |
| JP | 2010-244358 A | 10/2010 |

(Continued)

*Primary Examiner* — Andy Ho
(74) *Attorney, Agent, or Firm* — Jefferson IP Law, LLP

(57) ABSTRACT

Provided is an electronic device including a storage configured to store a plurality of operating systems (OSs) and a disk image; an input interface configured to receive a user input for switching focus from a first OS to a second OS; and a processor configured to mount, in response to the user input, to the second OS the disk image having been mounted to the first OS.

20 Claims, 19 Drawing Sheets

(56) References Cited

U.S. PATENT DOCUMENTS

2013/0232188 A1 9/2013 Yamashita et al.
2015/0067283 A1* 3/2015 Basu ...................... G06F 3/061
                                                    711/162

FOREIGN PATENT DOCUMENTS

| JP | 2011-191939 A | 9/2011 |
| JP | 2013-109776 A | 6/2013 |
| JP | 2013-186502 A | 9/2013 |
| KR | 10-1307342 B1 | 9/2013 |

* cited by examiner

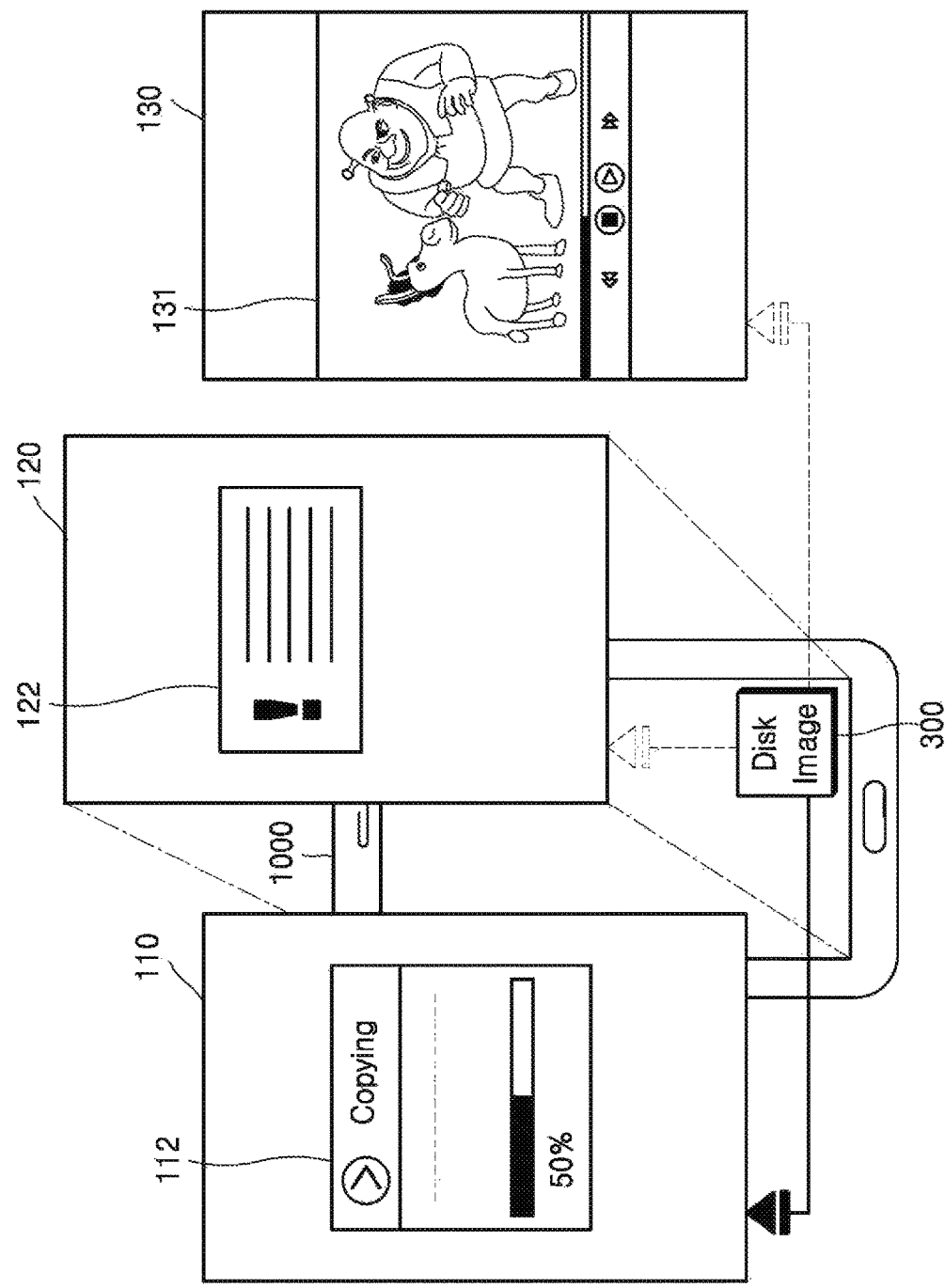

METHOD AND DEVICE FOR SHARING A DISK IMAGE BETWEEN OPERATING SYSTEMS

TECHNICAL FIELD

The present disclosure relates to a method and a device for sharing a disk image between operating systems.

BACKGROUND ART

Central Processing Unit (CPU)-based hardware such as a computer may be managed by an operating system (OS). However, a computer running a single OS may not be sufficient for a user's needs since the user is only allowed to use an application only supported by the single OS.

Therefore, virtualization technology has been developed to run a plurality of OSs which share a computer resource. Virtualization refers to running a plurality of OSs on a single physical hardware computer. Each OS may be referred to as a Virtual Machine (VM). Virtualization may be used to isolate an OS runtime environment to improve hardware efficiency and resource management.

When a plurality of OSs are operated in a single hardware platform, data may be shared between the OSs by using a network program such as a web-server and a File Transfer Protocol (FTP) server, or a file sharing protocol such as Server Message Block (SMB) or Common Internet File System (CIFS).

However, a file sharing method of the network program or the file sharing protocol may cause increased network overhead, and its setting may be difficult for users to perform.

In another method for sharing data between OSs, a virtual disk image may be used. A disk image is mounted and emulated as a storage in each OS, and then each OS recognizes the disk image as an actual storage. Each OS may allow users to write data to the mounted disk image and read data from the mounted disk image, so that data may be shared between OSs.

A plurality of OSs are operated on a single hardware platform, and a disk image is generated based on the hardware platform. If the disk image is accessed in the plurality of OSs at the same time, data duplication, data inconsistency, data corruption, or data collision may occur in the disk image.

Therefore, another method of sharing data between a plurality of OSs on a single hardware platform is needed.

DISCLOSURE

Technical Solution

In an example embodiment, an electronic device may include a storage configured to store a plurality of operating systems (OSs) and a disk image; an input interface configured to receive a user input switching focus from a first OS to a second OS; and a processor configured to mount, in response to the user input, to the second OS the disk image which has been mounted to the first OS.

Advantageous Effects

Data may be conveniently shared between a plurality of operating systems (OSs) according to an example embodiment.

Speed of data writing and data reading may improve according to an example embodiment.

A disk image may be automatically mounted in each OS based on focus switching without additional operation for mounting the disk image in each OS according to an example embodiment.

A disk image may be automatically unmounted or mounted in each OS, thus, data duplication, data inconsistency, data corruption, or data collision may be reduced according to an example embodiment.

A disk image may be seamlessly mounted in each OS based on focus switching according to an example embodiment.

A disk image may be mounted in each OS based on usage status of the disk image in each OS according to an example embodiment.

A disk image may be seamlessly mounted in each OS based on usage status of the disk image in each OS according to an example embodiment.

User experience where a disk image seems to be accessed in a plurality of OSs at the same time may be provided to users according to an example embodiment.

DESCRIPTION OF DRAWINGS

FIGS. 10A and 10B are schematic diagrams illustrating sharing of a disk image between a plurality of OSs in an electronic device, according to an example embodiment.

BEST MODE

Figure 1A:
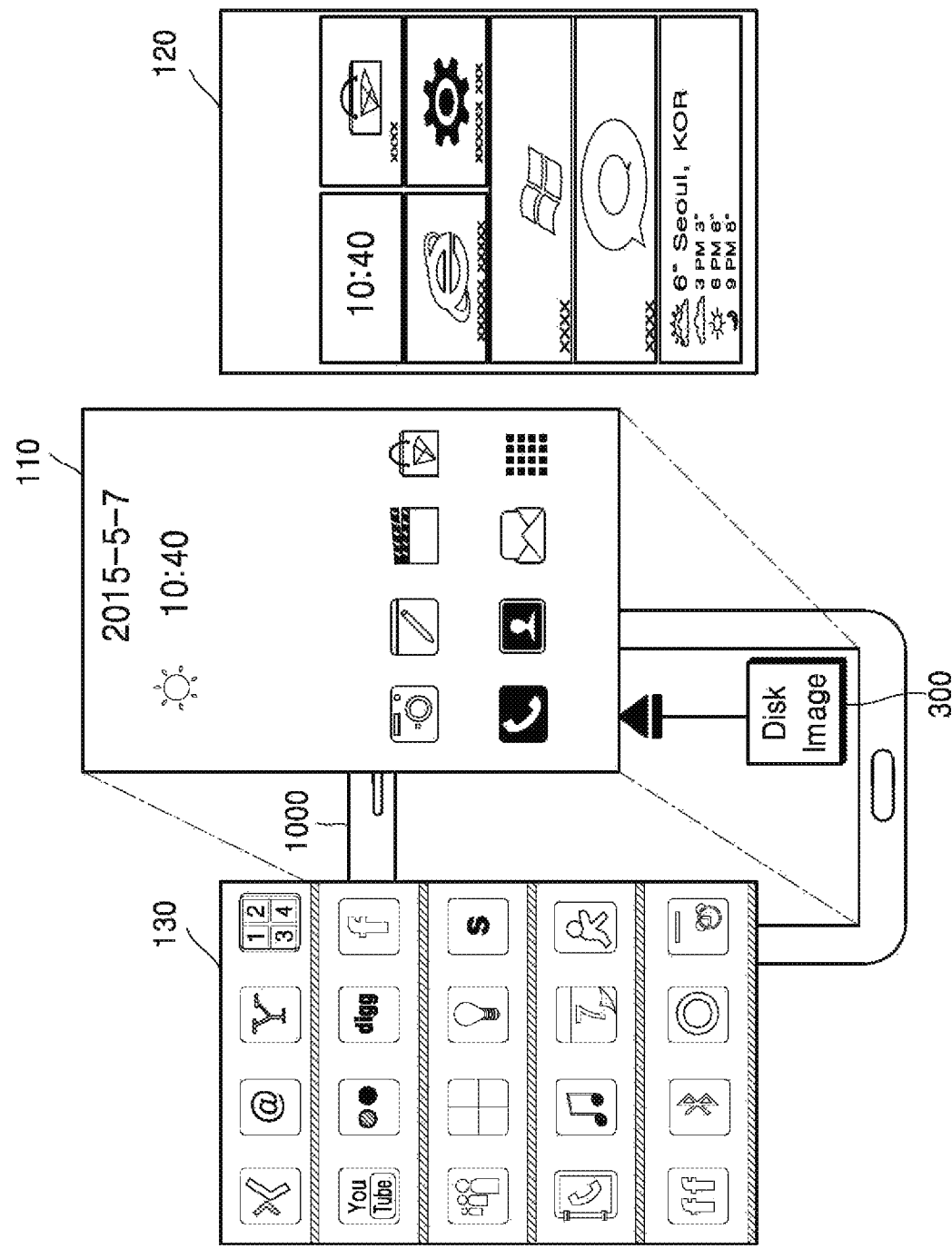
FIGS. 1A and 1B are schematic diagrams illustrating sharing of a disk image between a plurality of operating systems (OSs) in an electronic device, according to an example embodiment.

In an example embodiment, an electronic device may include a storage configured to store a plurality of operating systems (OSs) and a disk image; an input interface configured to receive a user input switching focus from a first OS to a second OS; and a processor configured to mount, in response to the user input, to the second OS the disk image which has been mounted to the first OS.

In an example embodiment, the processor may be further configured to mount the disk to the second OS in response to a user input for accessing the disk image in the second OS.

In an example embodiment, the processor may be further configured to pause writing operation on the disk image in the first OS, wherein the disk image is mounted to the second OS after the writing operation is paused in the first OS.

In an example embodiment, the processor may be further configured to remount to the first OS the disk image which has been mounted to the second OS, and resume the writing operation on the disk image in the first OS.

In an example embodiment, the processor may be further configured to determine, based on usage status of the disk image in the second OS, when to remount the disk image to the first OS.

In an example embodiment, the disk image may be remounted to the first OS based on input pattern of a user in the second OS.

In an example embodiment, the disk image may be remounted to the first OS based on at least one of input pattern in the second OS, workload to the disk image in the first OS, and workload to the disk image in the second OS.

In an example embodiment, the disk image may be mounted to the first OS and the second OS by a time-sharing way.

In an example embodiment, the processor may be further configured to determine, based on usage status of the disk image in the first OS, when to mount the disk image to the second OS.

In an example embodiment, the processor may be further configured to delay mounting of the disk image in the second OS when the usage status of the disk image in the first OS indicates a writing operation.

In an example embodiment, the usage status may be determined based on data input/output (I/O) pattern of the disk image in the first OS, and In an example embodiment, the data I/O pattern may be determined based on read throughput and write throughput of the disk image in the first OS.

In an example embodiment, the data I/O pattern may be determined based on read frequency and write frequency of the disk image in the first OS.

In an example embodiment, the processor may be further configured to mount the disk image to the first OS and the second OS in parallel.

In an example embodiment, usage authority of the disk image in the first OS and the second OS may be determined based on usage status of the disk image in the first OS.

In an example embodiment, usage authority of the disk image in the second OS may be determined as writable authority when the usage status of the disk image in the first OS indicates a read operation.

In an example embodiment, usage authority of the disk image in the second OS may be determined as read-only authority when the usage status of the disk image in the first OS indicates a writing operation.

In an example embodiment, each of the plurality of OSs may include an application for mounting the disk image, and the storage may store each application for the plurality of OSs.

In an example embodiment, a method may include mounting a disk image to a first operating system (OS); receiving a user input switching focus from the first OS to a second OS; and mounting, in response to the user input, to the second OS the disk image which has been mounted to the first OS.

In an example embodiment, a computer readable medium may include instructions, when executed by at least one processor, that cause the at least one processor to perform the above method.

MODE FOR INVENTION

Reference will now be made in detail to embodiments, examples of which are illustrated in the accompanying drawings. In this regard, the present embodiments may have different forms and should not be construed as being limited to the descriptions set forth herein. However, the exemplary embodiments may be realized in different forms, and are not limited to the embodiments in the present disclosure. In the accompanying drawings, like reference numerals refer to like elements throughout.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

As used herein, the singular forms "a", "an" and "the" are intended to include the plural forms as well, unless the context clearly indicates otherwise. It should be understood that the terms "comprises," "comprising," "including," and "having" are inclusive and therefore specify the presence of stated features or components, but do not preclude the presence or addition of one or more other features or components. Numbers described herein are examples for helping understanding, and embodiment should not be limited to the numbers.

In the present disclosure, the term such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an exemplary embodiment.

Terms used herein will now be briefly described and then one or more exemplary embodiments will be described in detail.

In the present disclosure, an electronic device may be a smartphone, tablet, personal digital assistant, media player, portable multimedia player, e-book reader, digital broadcast device, personal computer, laptop computer, micro server, navigation, music player, digital camera, mobile device, or image forming apparatus, but is not limited thereto.

Hypervisor may refer to a logical platform for operating a plurality of operating systems (OSs) in one hardware platform such as a smartphone. Hypervisor may generate a plurality of virtual machines operated independently in one hardware platform, and virtualize hardware resources. Virtual machine may be managed by each OS and communicate with hypervisor via virtualization framework such as a virtual input/output (VirtIO) to access hardware resource via hypervisor.

A various programs may be used as hypervisor, for example, Kernel Virtual Machine (KVM), Quick EMUlator (QEMU)®, Xen®, XenServer®, Logical Domain Hypervisor®, Virtage Hypervisor®, VMware ESX Server®, VMware Server®, VMware Workstation®, VMware Fusion®, Hyper-V®, Parallel Server®, Virtual PC®, 및 Virtual Server®, Virtual Box®, Parallels Workstation® Parallels Desktop®

In the present disclosure, a disk image may refer to a file storing content with a structure of a disk volume, which is mounted to an OS to be emulated as a disk by hypervisor. That is, the OS may recognize the disk image as a storage such as a flash memory or a hard disk.

In the present disclosure, focus may refer to a virtual indicator indicating an OS which is currently activated in an electronic device. For example, when an OS is activated in an electronic device and displayed in a full-screen mode, focus is located in the OS which is displayed in a full-screen mode.

When a plurality of OSs are displayed on a screen of an electronic device, for example, when the screen is divided in a plurality of regions in each of which each OS is displayed, or an OS is overlaid on another OS, focus is located in an OS that is used last time by a user.

In the present disclosure, a focus OS may refer to an OS in which focus is located, and a background OS may refer to an OS in which focus is not located.

Figure 1B:
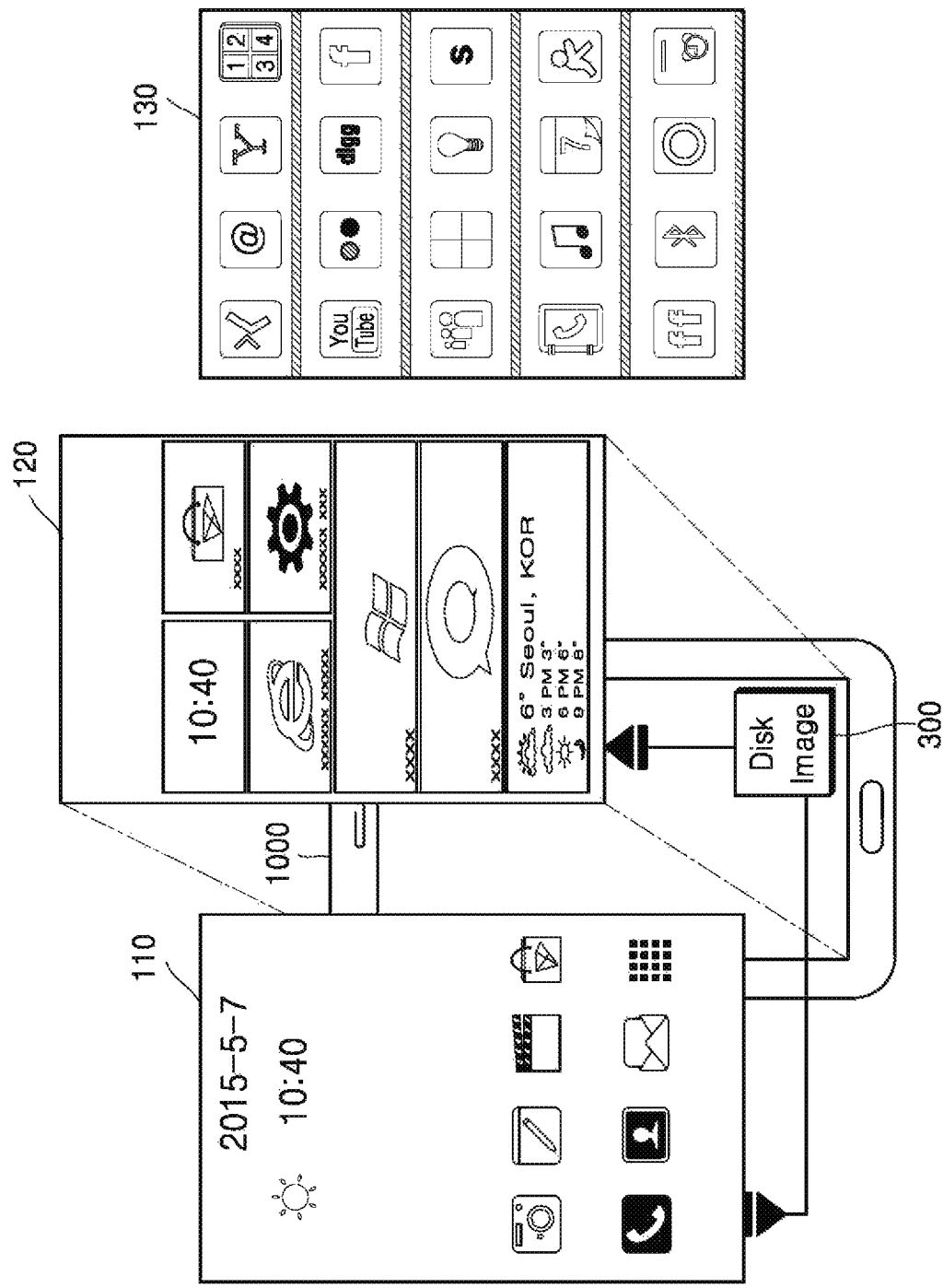

FIGS. 1A and 1B are schematic diagrams of sharing disk image between a plurality of OSs in an electronic device according to an example embodiment.

An electronic device 1000 is illustrated as a tablet computer in FIGS. 1A and 1B, but is not limited thereto. Referring to FIGS. 1A and 1B, the electronic device 1000 may run a plurality of OSs, and screens 110, 120, and 130 corresponding to the OSs may be displayed. In the present disclosure, a screen 110, 120, or 130 may refer to a corresponding OS. A first OS 110, a second OS 120, and a third OS 130 may be Android® 110, Windows® 120, and iOS® 130, respectively, but are not limited thereto.

Referring to FIG. 1A, a disk image 300 is mounted to the first OS 110 among a plurality of OSs 110, 120, and 130. When the disk image 300 is mounted to the first OS 110, the first OS 110 may recognize the disk image 300 as a storage.

Therefore, the disk image 300 may be accessed in the first OS 110, and the first OS 110 may read data stored in the disk image 300. Data processed in the first OS 110 may be stored in the mounted disk image 300, and users may store data in the mounted disk image 300.

The electronic device 1000 may receive a user input switching focus from the first OS 110 to the second OS 120 as illustrated in FIG. 1B, focus is switched to and located in the second OS 120, and the disk image 300, that has been mounted to the first OS 110, may be mounted to the second OS 120 based on a predetermined criterion.

When the disk image 300 is mounted to the second OS 120, the second OS 120 may recognize the disk image 300 as a storage. Here, the disk image 300 may store data processed or stored in the first OS 110.

Accordingly, the data processed or stored in the first OS 110 may be accessed in the second OS 120, thus, data may be shared between the first OS 110 and the second OS 120.

The disk image 300 may be recognized as a local disk in each OS, thus, speed of data writing and data reading may improve as compared to conventional data sharing based on network.

Furthermore, without additional operation of mounting the disk image 300 to the second OS 120, the disk image 300 may be mounted to the second OS 120 in response to focus switching, user does not need to manually mount the disk image to each OS.

As the disk image 300 is mounted to the third OS 130, data may be further shared among the first OS 110, the second OS 120, and the third OS 130.

Figure 2:
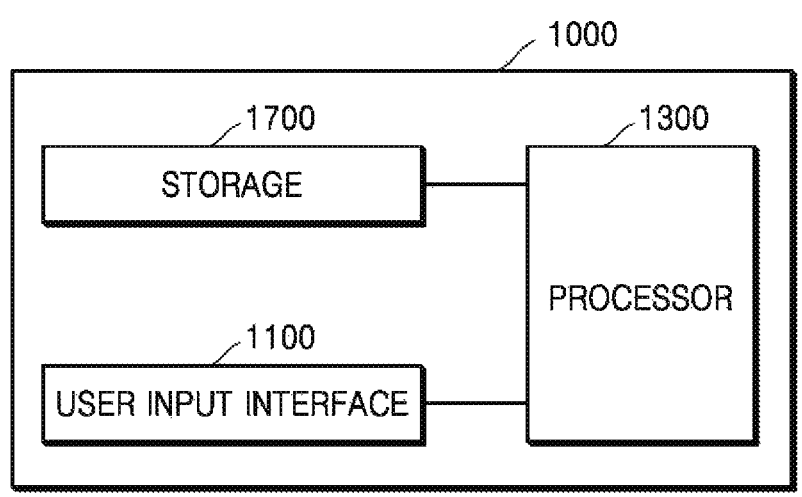
FIG. 2 and FIG. 3 illustrate an example electronic device.
Figure 3:
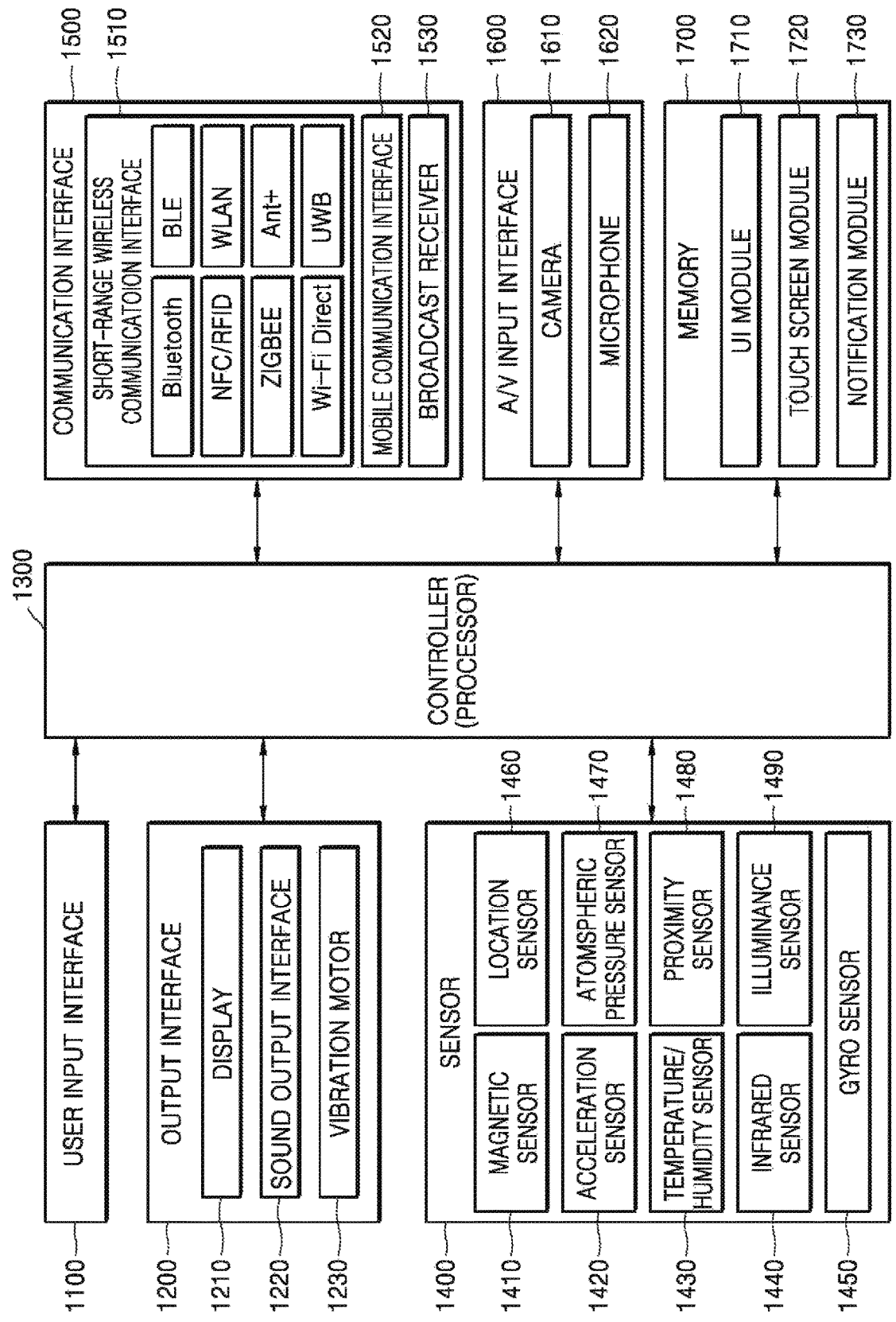

FIG. 2 and FIG. 3 illustrate an example electronic device.

In one exemplary embodiment, an electronic device 1000 may include a storage 1700, an input interface 1100, and a processor 1300. However, all the components shown in FIG. 2 are not essential components of the electronic device 1000. The electronic device 1000 may be implemented by more or less components than shown in FIG. 2.

The storage 1700 may store programs for processing and controlling of the processor 1300, and store data input to or output from the electronic device 1000.

In an example embodiment, the storage 1700 may store a plurality of OSs and a disk image.

An OS may include kernel, middleware, and application programming interface (API), but is not limited thereto. For example, an OS may by Android®, Windows®, iOS®, Black Berry OS®, Linux®, Meego®, Binary Runtime Environment for Wireless (BREW), Symbian®, Tizen®, and Bada®, but is not limited thereto.

A disk image may have a file format such as raw, qcow (QEMU Copy On Write), qcow2, and a file size of the disk image may increase as data is stored in the disk image. Furthermore, the disk image may have a file system which is supported by a plurality of OSs so that the disk image is accessed in each OS.

The input interface 1100 may be used for a user to input data to control the electronic device 1000.

In an example embodiment, the input interface 1100 may receive a user input switching focus from the first OS 110 to the second OS 120.

The processor 1300 may perform various functions of the electronic device 1000 by controlling overall operations of the electronic device 1000. For example, the processor 1300 may execute programs stored in the storage 1700 to control the storage 1700 and the input interface 1100.

In an example embodiment, the processor 1300 may mount the disk image 300, that has been mounted to the first OS 110, to the second OS 120 in response to receiving a user input switching focus from the first OS 110 to the second OS 120.

Referring to FIGS. 1A and 1B, when an OS is activated in an electronic device and displayed in a full-screen mode, focus is located in the OS which is displayed in a full-screen mode. Referring to FIG. 1A, focus is located in the first OS 110, so the first OS 110 is a focus OS, and the second OS 120 and the third OS 130 are background OSs. Referring to FIG. 1B, focus is located in the second OS 120, so the second OS 120 is a focus OS, and the first OS 110 and the third OS 130 are background OSs.

In an example embodiment, when focus is switched from the first OS 110 to the second OS 120 in response to receiving a user input switching focus, the electronic device 1000, which has displayed the first OS 110 in a full-screen mode, may display the second OS in a full-screen mode.

In an example embodiment, when the electronic device 1000 includes a touch screen display, a user input switching focus from the first OS to the second OS 120 may be a drag or swipe input, and the drag or swipe may be made by a plurality of fingers.

For example, when a drag or swipe moving to the left is received in the electronic device 1000 which displays the first OS 110 in a full-screen mode as illustrated in FIG. 1A, focus is switched from the first OS to the second OS 120 next to the first OS 110. Accordingly, the second OS 120 may be displayed in the electronic device 1000 in a full-screen mode as illustrated in FIG. 1B.

In an example embodiment, a user input switching focus from the first OS 110 to the second OS 120 may be a user input of executing the second OS 120. For example, a user input of executing the second OS 120 may be a user input to an icon, button, or shortcut for the second OS 120. The icon for the second OS 120 may be displayed in a screen of other OSs such as the first OS 110 and the third OS 130.

In an example embodiment, the electronic device 1000 may display a plurality of OSs on a screen at the same time. For example, a screen of the electronic device 1000 may be split to a plurality of regions, and each OS may be displayed in each region in the screen. An OS may be overlaid on another OS.

When a plurality of OSs are displayed on a screen of the electronic device 1000, a user input switching focus from the first OS to the second OS may be a user input of selecting a window of the second OS. The user input of selecting a window of the second OS may be a tap input of selecting the window of the second OS.

However, all the components shown in FIG. 2 are not essential components of the electronic device 1000. The electronic device 1000 may be implemented by more or less components than shown in FIG. 2. For example, as illustrated FIG. 3, the electronic device 1000 may further include an output interface 1200, a sensor 1400, a communication interface 1500, and an A/V input interface 1600.

Details of each component of the electronic device 1000 is described below.

The input interface 1100 may be used for a user to input data to control the electronic device 1000. For example, the input interface 1100 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, and a jog switch, but not limited thereto. When the display 1210 and a touch pad may be overlaid with each other to function as a touch screen, and the input interface 1100 may be used as not only an input device but also an output device.

The touch pad may detect a proximity touch as well as a real-touch, both of which may be referred to as a touch.

The real touch may be made by bringing a pointer into contact with the touch pad, and the proximity touch may be made by bring the pointer closer to the touch pad.

The pointer denotes a touch instrument for the real touch or the proximity touch. For example, the pointer may be a stylus pen, a finger, etc.

The output interface 1200 may be used for outputting an audio signal, a video signal, or a vibration signal, and may include a display 1210, a sound output interface 1220, and a vibration motor 1230.

The display 1210 may display information processed in the electronic device 1000. For example, a screen of an operating system, a screen of an application system executed in the operating system may be displayed on the display 1210.

The display 1210 and a touch pad may be overlaid with each other to function as a touch screen, and the display 1210 may be used as not only an output device but also an input device. The display 1210 may include at least one from among a liquid crystal display, a thin-film transistor-liquid crystal display, an organic light-emitting diode, a flexible display, a 3D display, and an electrophoretic display. Furthermore, the electronic device 1000 may include two or more displays 1210 according to embodiments. The two or more displays 1210 may be disposed to face each other across a hinge.

The sound output interface 1220 may output audio data received from the communication interface 1500 or stored in the storage 1700. Furthermore, the sound output interface 1220 may output a sound signal (e.g., a call signal reception sound, a message reception sound, a notification sound, etc.) related to a function performed by the electronic device 1000. The sound output interface 1220 may include a speaker, a buzzer, etc.

The vibration motor 1230 may output a vibration signal. For example, the vibration motor 1230 may output a vibration signal based on outputting audio or video data. The vibration motor 1230 may output a vibration signal in response to receiving a touch input.

The processor 1300 may perform various functions of the electronic device 1000 by controlling overall operations of the electronic device 1000. For example, the processor 1300 may execute programs stored in the storage 1700 to control the input interface 1100, the output interface 1200, the sensor 1400, the communication interface 1500, and the A/V input interface 1600, etc.

The sensor 1400 may sense a state of or ambient state of the electronic device 1000 and transmit a result of the sensing to the processor 1300.

The sensor 1400 may include at least one from among a magnetic sensor 1410, an acceleration sensor 1420, a temperature/humidity sensor 1430, an infrared sensor 1440, a gyroscope 1450, a location sensor 1460 such as a GPS, an atmospheric pressure sensor 1470, a proximity sensor 1480, and a illuminance sensor 1490, but not limited thereto. A function of each sensor would be intuitively inferred by those of ordinary skill in the art, and detailed explanation thereof is omitted in this disclosure.

The communication interface 1500 may include at least one element for establishing communication with other devices. For example, the communication interface 1500 may include a short-range communication interface 1510, a mobile communication interface 1520, and a broadcast receiver 1530.

The short-range communicator 151 may include a BLUETOOTH communicator, a BLUETOOTH Low Energy (BLE) communicator, a Near Field Communicator, a WLAN communicator, a ZigBee communicator, an Infrared Data Association communicator, a Wi-Fi Direct communicator, a Ultra WideBand communicator, an Ant+ communicator, a Z-wave communicator, etc.

The mobile communication interface 1520 may communicate a radio signal with at least one from among a base station, an external terminal, and a server via a mobile communication network. Here, the radio signal may be a voice call signal, a video call signal, or data in any one of various formats according to transmission and reception of a text/multimedia message.

The broadcast receiver 1530 may receive a broadcasting signal and/or broadcast-related information from the outside via a broadcasting channel. The broadcasting channel may include a satellite channel, a terrestrial channel, etc. The electronic device 1000 may not include the broadcast receiver 1530 according to embodiments.

The A/V input interface 1600 may include a camera 1610 and a microphone 1620 to receive an audio signal or a video signal. The camera 1610 may acquire an image frame such a still image or a video by an image sensor in a video call mode or a capturing mode. Images captured by the image sensor may be processed by the processor 1300 or an image processor.

Images processed by the camera 1610 may be stored in the storage 1700, or transmitted to the outside through the communication interface 1500. The device 1000 may include two or more cameras 1610 according to embodiments.

The microphone 1620 may receive and process a sound signal from the outside to convert it to an electronic sound data. For example, the microphone 1620 may receive a sound signal from an external device or a speaker. The microphone 1620 may employ any of various noise-reduction algorithms to reduce noise occurring while receiving a sound signal from the outside. The microphone 1620 may receive an user input of voice answer.

The storage 1700 may include at least one from among a flash memory type memory, a hard disk type memory, a multimedia card micro type memory, a card type memory (e.g., a secure digital (SD) memory, an extreme digital (XD) memory, etc.), a random-access memory (RAM), a static RAM (SRAM), a read-only memory (ROM), a programmable ROM (PROM), an electrically erasable PROM (EEPROM), a magnetic memory, a magnetic disk, and an optical disc. The storage may be referred to as a memory.

Programs stored in the storage 1700 may be classified into a plurality of modules such as a UI module 1710, a touch screen module 1720, and a notification module 1730 according to embodiments.

The UI module 1710 may provide a UI or a GUI according to each application to interact with the device 1000. The touch screen module 1720 may detect a user's touch gesture on a touch screen and transmit information regarding the touch gesture to the processor 1300. The touch screen module 1720 according to one exemplary embodiment may recognize and analyze touch codes. The touch screen module 1720 may be embodied as hardware including a processor.

A sensor may be employed in or near the touch screen to detect a touch or a proximity touch on or above the touch screen. For example, a tactile sensor may be used. The tactile sensor may sense a contact of an object to a certain extent, the extent being equal to or more than humans do. The tactile sensor may detect various information such as a roughness of a contact surface, hardness of a contacting object, and a temperature at a contact point.

For example, a proximity sensor may be used. The proximity sensor may detect an object approaching or near a detection surface without a physical contact by using the force of an electromagnetic field or an infrared ray. The proximity sensor may be a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor, but not limited thereto.

For example, a force touch sensor may be used. Different functions may be performed based on the pressure of touch.

A gesture input may include a tap, a double-tap, a multiple-tap, a long tap, etc. The touch gesture may include a tap, a touch and hold gesture, a double tap, dragging, panning, a flick, a drag and stop gesture, a swipe, or so on. A drag input may be received by moving a pointer touched, and a swipe input may be received by moving a pointer more quickly than the drag input.

The notification module 1730 may generate a signal for notifying an occurrence of an event at the device 1000. The event occurring at the device 1000 may include a call signal reception, a message reception, a key signal reception, a schedule notification, etc. The notification module 1730 may output a notification signal through the display 1210 in the form of a video signal, through the sound output interface 1220 in the form of a sound signal, or though the vibration motor 1230 in the form of a vibration signal.

Each component of, or at least a part of the device 1000 may be embodied by at least one hardware processor. Each or every component of the electronic device 1000 may be embodied by an additional processor in addition to a main processor of the electronic device 1000.

Each component of, or at least a part of the device 1000 may be embodied by at least one software program module. For example, a function of the device 1000 may be embodied by an operating system or an application program. Accordingly, functions of the device 1000 may be embodied by a combination of hardware and software.

In an example embodiment, the electronic device 1000 may include a processor, a memory for storing program data, a permanent storage such as a disk drive, a communication port for communicating an external device, and a user interface device such as a touch panel, a key, and a button. Methods embodied by a software module or algorithm may be stored in a computer readable medium as codes or program instructions executable by a processor. The computer readable medium may include a flash memory type memory, a hard disk type memory, a multimedia card micro type memory, a card type memory (e.g., a secure digital (SD) memory, an extreme digital (XD) memory, etc.), a random-access memory (RAM), a static RAM (SRAM), a read-only memory (ROM), a programmable ROM (PROM), an electrically erasable PROM (EEPROM), a magnetic memory, a magnetic disk, and an optical disc. The computer readable medium may be distributed to computers connected via a network, and codes or instructions may be stored and executed in a distributed way. The computer readable medium may be read by a computer, stored in a memory, and executed by a processor.

Figure 4:
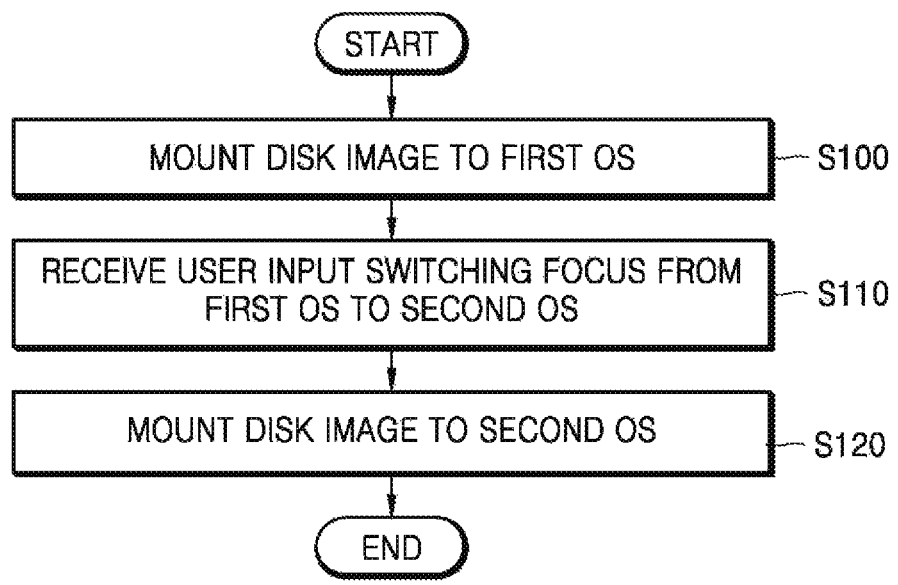
FIG. 4 illustrates a flowchart of a method of sharing a disk image between a plurality of OSs, according to an example embodiment.

FIG. 4 illustrates a flowchart of a method of sharing a disk image between a plurality of OSs according to an example embodiment.

An explanation of the flowchart is further refereed to FIGS. 1A and 1B.

In operation S100, the electronic device 1000 may mount a disk image 300 to a first OS 110.

Referring to FIG. 1A, the first OS 110 may be Android. When the disk image 300 is mounted to the first OS 110, the mounted disk image 300 may be accessed in the first OS 110.

When the disk image 300 is mounted to the first OS 110 as illustrated in FIG. 1A, the first OS 110 may recognize the disk image 300 as a storage medium such as a flash memory or a hard-disk. Furthermore, the first OS 110 may have writable authority on the disk image 300.

The first OS 110 may read data from the mounted disk image 300.

For example, when an audio file is stored in the mounted disk image 300, the audio file may be accessed and played by a music player of the first OS 110. Data may be copied from the mounted disk image 300 to the first OS 110.

Data processed in the first OS 110 may be written to the mounted disk image 300. That is, data processed in the first OS 110 may be stored in the mounted disk image 300.

For example, when a save folder of a camera application of the first OS is set as the disk image 300 or a folder in the disk image 300, an image captured by the camera application may be stored in the disk image 300. Data downloaded by the first OS 110 may be stored in the disk image 300, and data may be copied from the first OS 110 to the disk image 300.

In operation S110, the electronic device 1000 may receive a user input switching focus from the first OS 110 to the second OS 120.

Referring to 1A and 1B, when focus is switched from the first OS 110 to the second OS 120 in response to receiving a user input switching focus, the electronic device 1000, which has displayed the first OS 110 in a full-screen mode, may display the second OS in a full-screen mode. The second OS 120 may be Windows®.

In operation S120, the electronic device 120 may mount the disk image 300, that has been mounted to the first OS 110, to the second OS 120 based on a predetermined criterion in response to receiving a user input switching focus from the first OS 110 to the second OS 120 in operation S110.

The predetermined criteria for mounting the disk image 300, which has been mounted to the first OS 110, to the second OS 120 may vary according to an embodiment.

For example, the electronic device 1000 may mount the disk image 300, which has been mounted to the first OS 110, to the second OS 120 when receiving a user input switching focus from the first OS 110 to the second OS 120, or when focus is switched from the first OS 110 to the second OS 120.

When the disk image 300 is mounted to the second OS 120 as illustrated in FIG. 1B, the first OS 120 may recognize the disk image 300 as a storage medium such as a flash memory or a hard-disk. Furthermore, the second OS 120 may have writable authority on the disk image 300.

Therefore, the second OS 120 may read data stored in the mounted disk image 300 or store data to the mounted disk image 300 as the first OS 110 does. The second OS 120 may use data stored by the first OS 110, thus, data may be shared between the first OS 110 and the second OS 120 conveniently.

The disk image 300 may be recognized as a local disk in each OS, thus, speed of data writing and data reading may improve as compared to conventional data sharing based on network.

Furthermore, without additional operation of mounting the disk image 300 to the second OS 120, the disk image 300 may be mounted to the second OS 120 in response to focus switching, user does not need to manually mount the disk image to each OS.

The first OS 110 and the second OS 120 may have writable authority on the disk image 300, and the disk image 300 may be mounted to the first OS 110 and the second OS 120 in parallel. Here, the first OS 110 and the second OS 120 may try to write data to the disk image 300 at the same time, which may result in data duplication, data inconsistency, data corruption, or data collision in the disk image 300.

In an example embodiment, the electronic device 1000 may unmount the disk image 300 from the first OS 110. A time point when the disk image 300 is unmounted from the first OS 110 may be earlier or later than a time point when the disk image 300 is mounted to the second OS 120. Two-time points may coincide with each other.

After the disk image 300 is unmounted from the first OS 110, the disk image 300 may not be accessed by the first OS 110. That is, the first OS 110 may not be able to read data stored in the mounted disk image 300 or store data to the mounted disk image 300.

Therefore, the disk image 300 is not accessed by the first OS 110 and the second OS 120 at the same time, data corruption may be reduced.

In an example embodiment, the electronic device 1000 may automatically store data on a process in the first OS 110 to the disk image 300 before the disk image 300 is unmounted from the first OS 110.

Accordingly, the second OS 120 may use data which has been on a process in the first OS 110, thus, data may be shared between the first OS 110 and the second OS 120 effectively.

In an example embodiment, the electronic device 1000 may pause an operation to the disk image 300 in the first OS, and then unmount the disk image 300 from the first OS 110. An explanation of a method of unmounting the disk image 300 will be described below by referring to FIG. 11.

Figure 5:
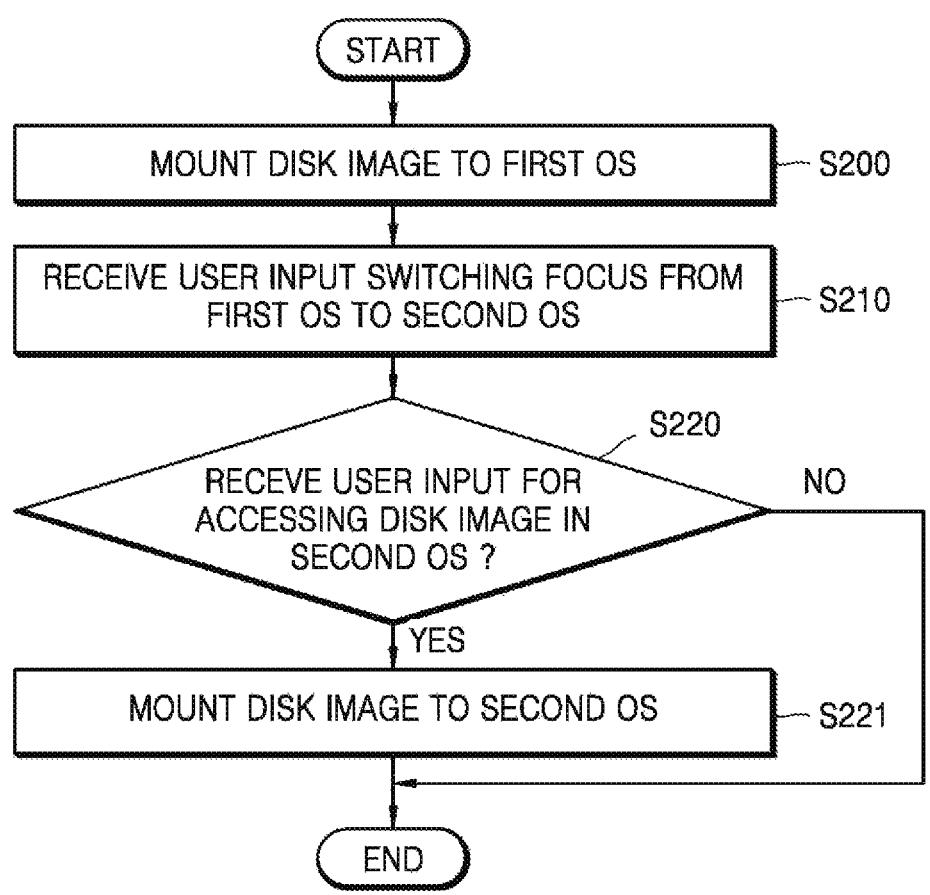
FIG. 5 illustrates a flowchart of a method of sharing a disk image between a plurality of OSs, according to an example embodiment.

FIG. 5 illustrates a flowchart of a method of sharing a disk image between a plurality of OSs according to an example embodiment.

An explanation with respect to operations S100 and S110 may be applied to operations S200 and S210, thus redundant explanation is omitted.

Figure 6:
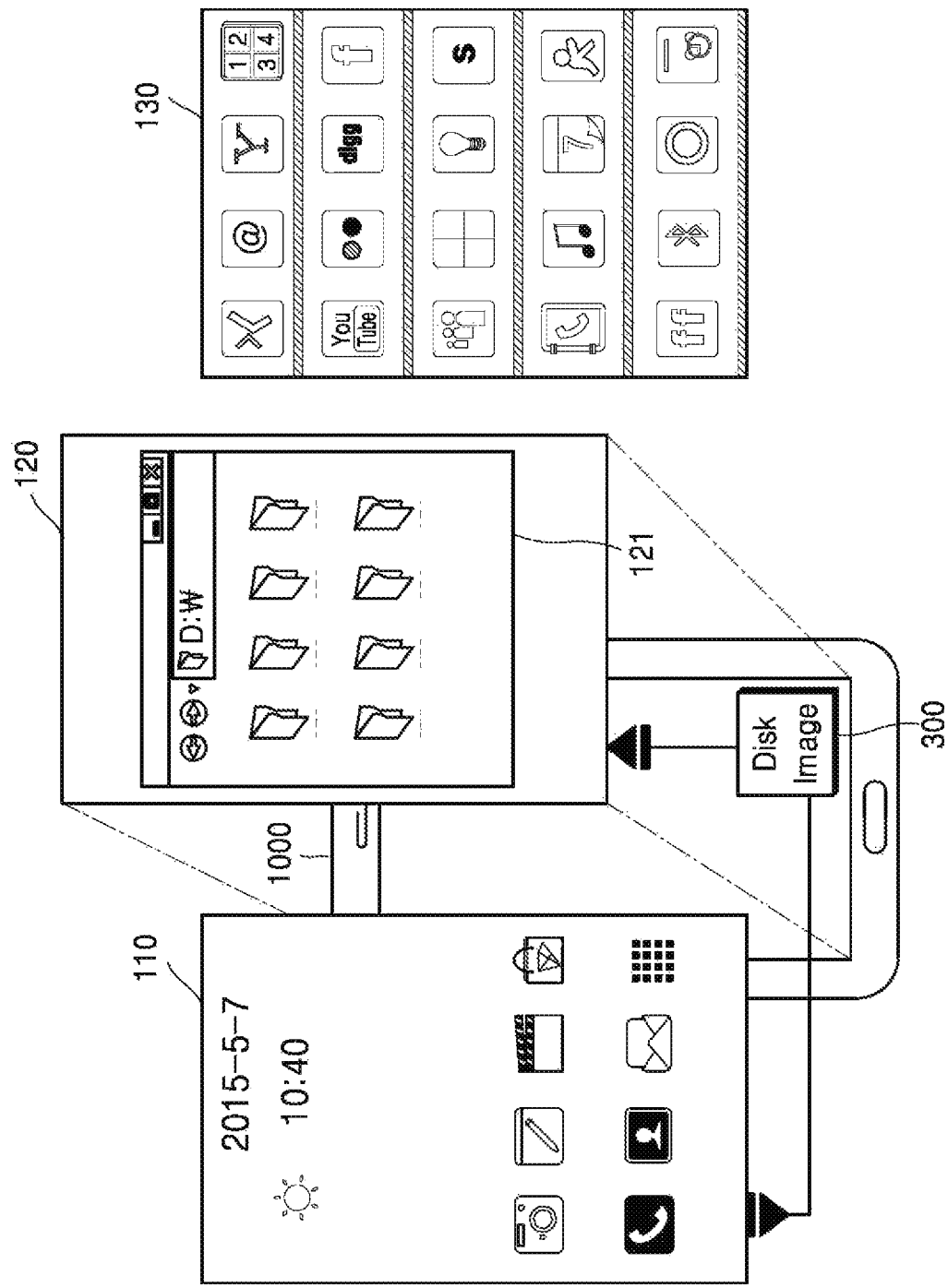
FIG. 6 is a schematic diagram illustrating sharing of a disk image between a plurality of OSs in an electronic device, according to an example embodiment.

Explanation of the flowchart is further referred to FIG. 6.

FIG. 6 illustrates a flowchart of a method of sharing a disk image between a plurality of OSs according to an example embodiment.

In operation S220, the electronic device 220 may determine, in response to receiving a user input switching focus from the first OS 110 to the second OS 120 in operation S210, that a user input for accessing the disk image 300 in the second OS 120 is received.

In an example embodiment, the user input for accessing the disk image 300 in the second OS 120 may be a user input for writing data to the disk image 300 or reading data from the disk image 300.

For example, referring to FIG. 6, the user input for accessing the disk image 300 in the second OS 120 may be a user input for opening the disk image 300 in the second OS 120. When the disk image 300 is opened in the second OS 120, a window 121 including files and folders of the disk image 300 may be popped up.

In an example embodiment, the user input for accessing the disk image 300 in the second OS 120 may be a user input for executing an application which is set to write data to the disk image 300 or read data from the disk image 300. Furthermore, the user input for accessing the disk image 300 in the second OS 120 may be a user input for executing a function of the application which is set to write data to the disk image 300 or read data from the disk image 300.

For example, when an image is captured by a camera application of the second OS 120, the captured image is stored in a save folder which is set by the camera application. If the save folder of the camera application is set to the disk image 300 or its folder, the user input for accessing the disk image 300 in the second OS 120 may be a user input for executing the camera application in the second OS 120 or executing a capture function in the second OS 120.

In operation S221, the electronic device 1000 may mount the disk image 300, that has been mounted to the first OS 110, to the second OS 120 in response to a user input for accessing the disk image 300 in the second OS 120 in operation S220.

In an example embodiment, referring to FIG. 6, the electronic device 1000 may unmount the disk image 300 from the first OS 110. In an example embodiment, the electronic device 1000 may automatically store data on a process in the first OS 110 to the disk image 300 before the disk image 300 is unmounted from the first OS 110.

Accordingly, the second OS 120 may use data which has been on a process in the first OS 110, thus, data may be shared between the first OS 110 and the second OS 120 effectively.

When the user input for accessing the disk image 300 in the second OS 120 is not received, the disk image 300 may remain as mounted to the first OS 110. Therefore, a process on the disk image 300 in the first OS 110 which is a background OS is not stopped while a user uses the second OS 120 which is a focus OS. For example, when a music file in the disk image 300 is played by the first OS 110, the music file may remain as played by the first OS 110 since the disk image 300 is not unmounted from the first OS 110 even after focus is switched from the first OS 110 to the second OS 120.

As described above, after focus is switched from the first OS 110 to the second OS 120 and a user input for accessing the disk image 300 in the second OS 120 is received, the disk image 300 is unmounted from the first OS 110 and mounted to the second OS 120 efficiently.

Figure 7:
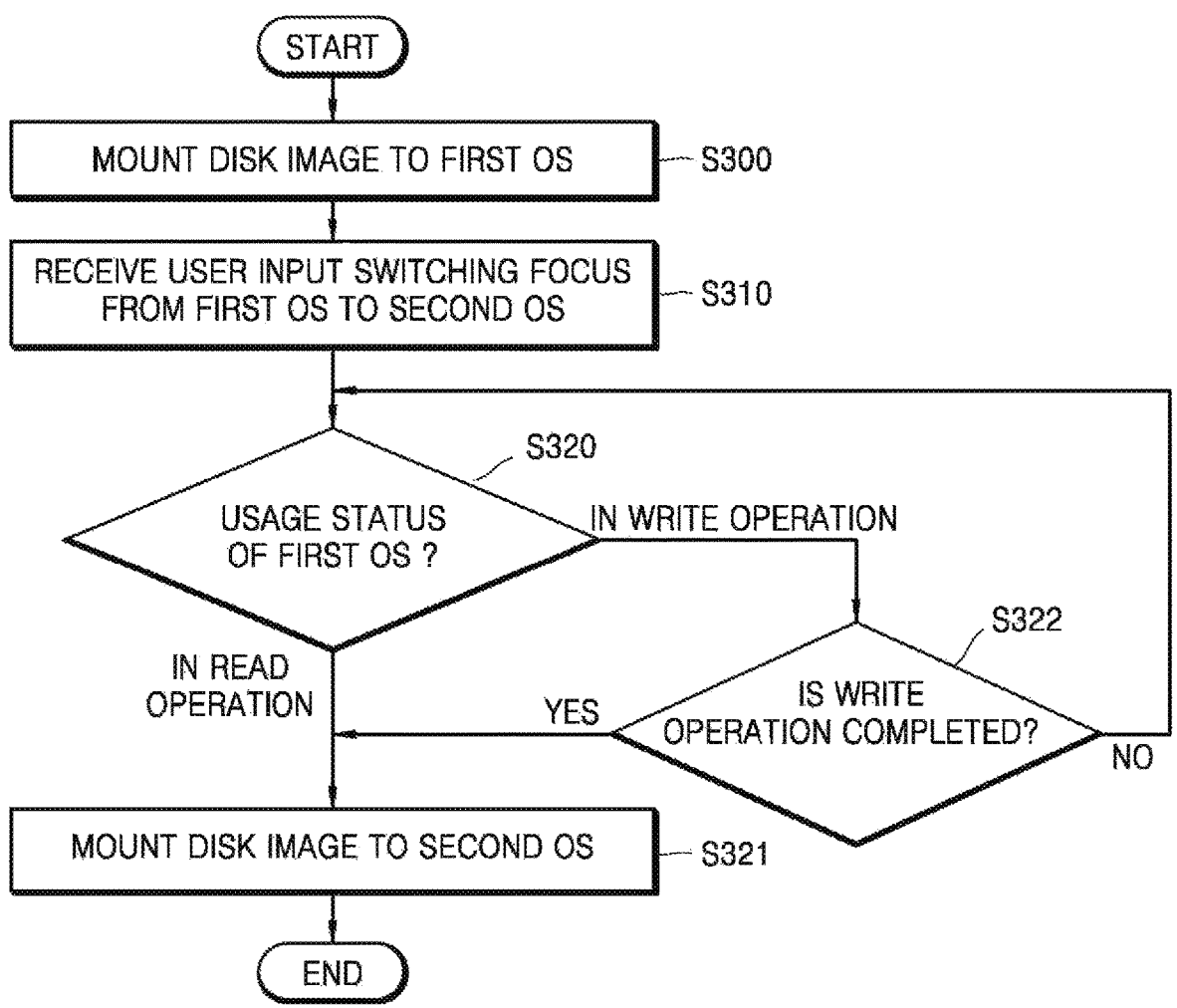
FIG. 7 illustrates a flowchart of a method of sharing a disk image between a plurality of OSs, according to an example embodiment.

FIG. 7 illustrates a flowchart of a method of sharing a disk image between a plurality of OSs according to an example embodiment.

An explanation with respect to operations S100 and S110 may be applied to operations S300 and S310, thus redundant explanation is omitted.

Figure 8A:
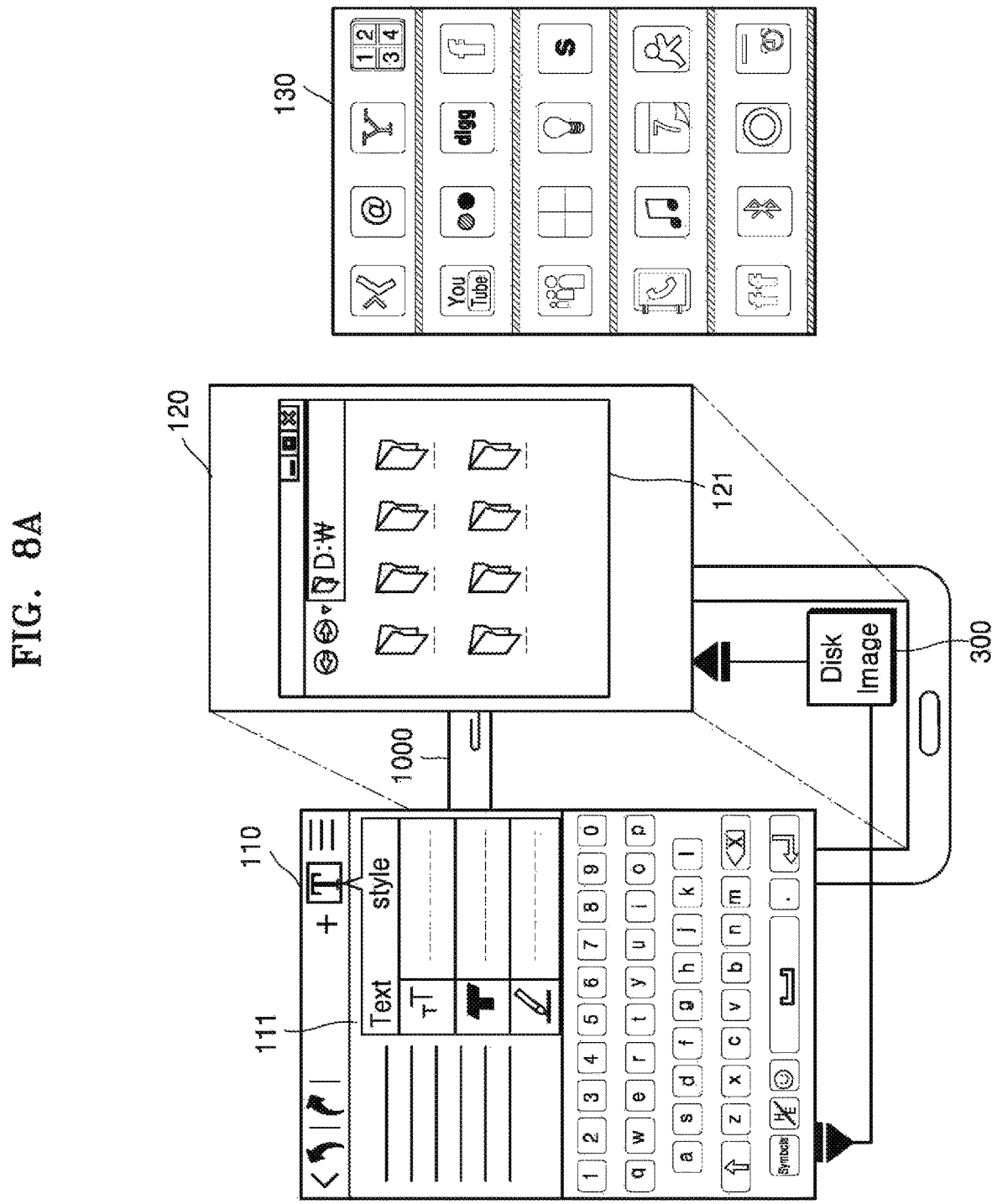
FIGS. 8A and 8B are schematic diagrams illustrating sharing of a disk image between a plurality of OSs in an electronic device, according to an example embodiment.
Figure 8B:
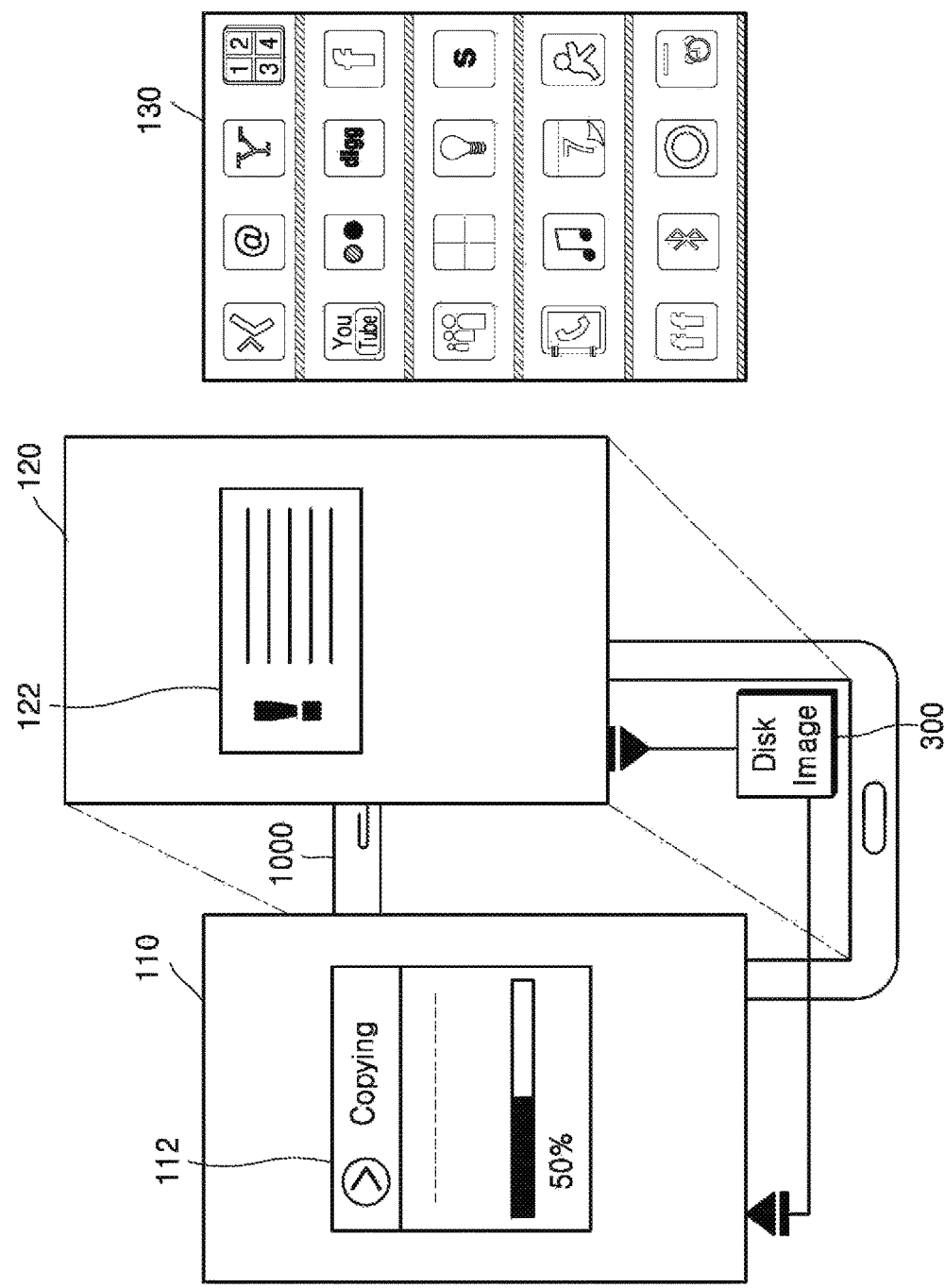

An explanation of the flowchart is further refereed to FIGS. 8A and 8B.

FIGS. 8A and 8B are schematic diagrams of sharing disk image between a plurality of OSs in an electronic device according to an example embodiment.

In operation S320, the electronic device 1000 may determine, in response to receiving a user input switching focus from the first OS 110 to the second OS 120 in operation S310, usage status of the disk image 300 in the first OS 110.

In an example embodiment, usage status of the disk image 300 in the first OS 110 may include a write operation status and a read operation status.

For example, referring to FIG. 8A, when a document file stored in the disk image 300 is opened by a document editing application 111 in the first OS 110, usage status of the disk image 300 in the first OS 110 may be determined as a read operation status. For example, referring to FIG. 8A, when a document file stored in the disk image 300 is opened by a document editing application 111 in the first OS 110, usage status of the disk image 300 in the first OS 110 may be determined as a read operation status.

When the document editing application is executed in the first OS 110 and the document file in the disk image 300 is opened, the document file may be stored in RAM of the electronic device 1000.

However, referring to FIG. 8B, while a document file is being stored in the disk image 300 in the first OS 110, usage status of the disk image 300 in the first OS 110 may be determined as a write operation status. While data is being stored in the first OS 110, a data processing window 112 may be popped up in the first OS 110. The data processing window 112 may include information regarding processing status of data. The data processing window 112 may popped up when data is being copied or downloaded. For example, the data processing window 112 may include information regarding a total size of data, a size of saved data, processing speed, estimated completion time, and remaining time, and a progressing bar.

In an example embodiment, usage status of the disk image 300 in the first OS 110 may be determined based on data input/output (I/O) pattern of the disk image 300 in the first OS 110.

Data I/O pattern may be determined based on read throughput and write throughput of the disk image 300. For example, the usage status of the disk image 300 may be determined as a write status or a read status when write throughput or read throughput exceeds a certain value respectively.

Which operation is performed on disk image 300 in the first OS 110 may be determined specifically based on comparing write throughput and read throughput with network download speed, local file transfer speed, file playing speed.

For example, write throughput and read throughput is equal to or more than X % of average network download speed, average local file transfer speed, or average file playing speed in the first OS 110, the electronic device 1000 may determine which operation performed on the disk image 300 in the first OS 110, for example, a file downloading operation, a file copying operation, or a file playing operation.

Data I/O pattern may be determined based on read frequency and write frequency of the disk image 300. For example, the usage status of the disk image 300 may be determined as a write status or a read status when write frequency or read frequency exceeds a certain value respectively.

In operation S321, the electronic device 1000 may mount the disk image 300, that has been mounted to the first OS 110, to the second OS 110 when the usage status of the disk image 300 in the first OS 110 is determined as a read status.

In an example embodiment, referring to FIG. 8A, the electronic device 1000 may unmount the disk image 300 from the first OS 110. In an example embodiment, the electronic device 1000 may automatically store data on a process in the first OS 110 to the disk image 300 before the disk image 300 is unmounted from the first OS 110.

In an example embodiment, the first OS 110 may automatically store a document file on a editing process in a document editing application 111 to the disk image 300 before the disk image 300 is unmounted from the first OS 110. If the document file on a editing process in the first OS is automatically stored in the disk image 300, a user may continue editing the document file in the second OS 120.

Before the disk image 300 is unmounted from the first OS 110, data may still remain in RAM of the electronic device 1000. Therefore, user may continue using the data being remained in RAM of the electronic device 1000 in the first OS 110 after the disk image 300 is remounted to the first OS 110. Data being remained in RAM may be stored in the remounted disk image 300. In operation S321, the electronic device 1000 may delay mounting the disk image 300 to the second OS 120 when the usage status of the disk image 300 in the first OS 110 is determined as a write status.

In an example embodiment, the electronic device 1000 may mount the disk image 300 to the second OS 120 after a write operation on the disk image 300 in the first OS 110 is completed.

Therefore, data in processing may be preserved safely according to an example embodiment.

If a user input switching focus from the second OS 120 to the first OS 110 before a write operation on the disk image 300 in the first OS 110 is completed, the electronic device 1000 may keep the disk image 300 to be mounted to the first OS 110 without mounting the disk image to the second OS 120.

In an example embodiment, when the mounting the disk image 300 to the second OS 120 is delayed or on standby, the electronic device 1000 may display a notification 122 indicating delay or standby as illustrated in FIG. 8B.

The notification 122 may include usage status of the disk image 300 in the first OS 110. For example, referring to FIG. 8B, the notification 122 may say "Copying files to the disk image 300 in the first OS 110." In an example embodiment, the notification 122 may further include information regarding progress of a write operation of the disk image 300 in the first OS 110.

In an example embodiment, the notification 122 may ask a user to select an option of forced-unmounting the disk image 300 from the first OS 110. Therefore, the disk image 300 may be unmounted and mounted according to user's intention according to an example embodiment.

By switching focus from the first OS 110 to the second OS 120 and mounting the disk image 300 to the second OS 120 based on a usage status of the disk image 300 in the first OS, the disk image 300 is unmounted from the first OS 110 and mounted to the second OS 120 efficiently.

Figure 9:
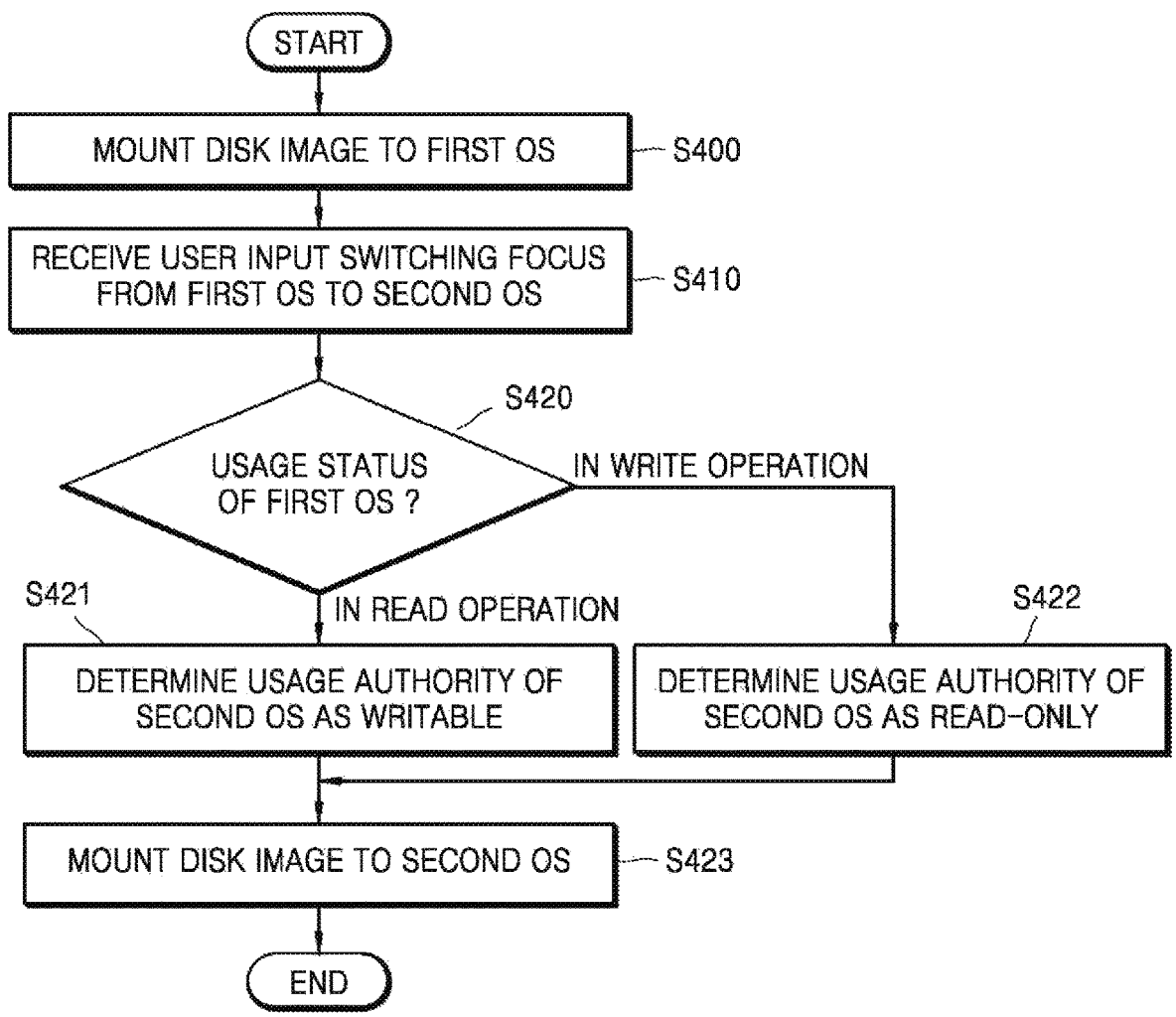
FIG. 9 illustrates a flowchart of a method of sharing a disk image between a plurality of OSs, according to an example embodiment.

FIG. 9 illustrates a flowchart of a method of sharing a disk image between a plurality of OSs according to an example embodiment.

Figure 10A:
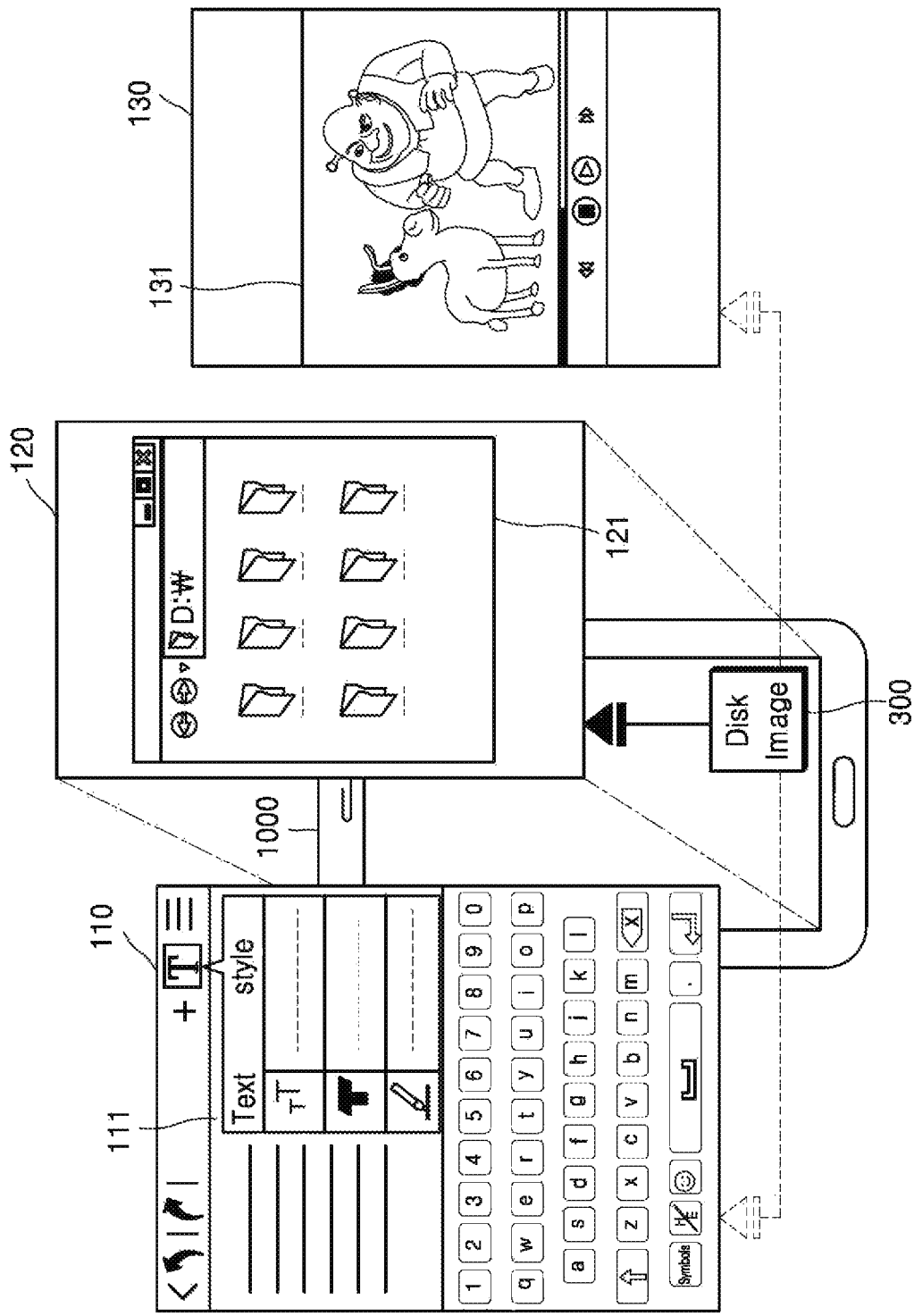

An explanation of the flowchart is further refereed to FIGS. 10A and 10B.

FIGS. 10A and 10B are schematic diagrams of sharing disk image between a plurality of OSs in an electronic device according to an example embodiment.

In operation S400, the electronic device 1000 may mount a disk image 300 to a first OS 110.

Referring to FIGS. 10A and 10B, the electronic device 1000 may mount the disk image 300 to the OSs 110, 120, and 130 in parallel.

If the disk image 300 is mounted to the OSs 110, 120, and 130 in parallel and the OSs 110, 120, and 130 have writable authority, data duplication, data inconsistency, data corruption, or data collision may occur.

Therefore, the electronic device 1000 may allow only one OS to have writable authority on the disk image 300 at the same time. Referring to FIGS. 10A and 10B, an arrow in a dash line refers to the disk image 300 is mounted as read-only authority, and an arrow in a solid line refers to the disk image 300 is mounted as writable authority.

Referring to FIG. 10A, the first OS 110 may have read-only authority on the disk image 300.

In operation S410, the electronic device 1000 may receive a user input switching focus from the first OS 110 or 130 to the second OS 120.

Referring to 10A, when focus is switched from the first OS 110 or 130 to the second OS 120 in response to receiving a user input switching focus, the electronic device 1000, which has displayed the first OS 110 or 130 in a full-screen mode, may display the second OS in a full-screen mode.

In operation S420, the electronic device 1000 may determine, in response to receiving a user input switching focus from the first OS 110 or 130 to the second OS 120 in operation S310, usage status of the disk image 300 in the first OS 110 or 130.

The electronic device 1000 may determine usage authority of the second OS 120 based on a usage status of the disk image 300 in the first OS 110 or 130.

In operation S421, the electronic device 1000 may determine usage authority of the second OS 120 as writable authority when the usage status of the disk image 300 in the first OS 110 or 130 may be determined as a read operation status.

Referring to FIG. 10A, when a document file stored in the disk image 300 is opened and edited by a document editing application 111 in the first OS 110, usage status of the disk image 300 in the first OS 110 may be determined as a read operation status.

When a video file in the disk image 300 is played by a video player of the first OS 130, the usage status of the disk image 300 in the first OS 130 may be determined as a read operation status.

In an example embodiment, when the first OS 110 or 130 having writable authority is performing a read operation on the disk image 300, the electronic device 1000 may change usage authority on the disk image 300 of the first OS 110 or 130 to a read-only authority.

In an example embodiment, the electronic device 1000 may automatically store data on a process in the first OS 110 to the disk image 300 before usage authority on the disk image 300 of the first OS 110 or 130 is determined as read-only authority.

In operation S422, the electronic device 1000 may determine usage authority of the second OS 120 as read-only authority when the usage status of the disk image in the first OS 110 or 130 is determined as a write operation status.

Referring to FIG. 10B, while a file is being copied to the disk image 300 in the first OS 110, usage status of the disk image 300 in the first OS 110 may be determined as a write operation status. Therefore, the electronic device 1000 may determine usage authority on the disk image 300 of the second OS 120 as read-only authority. If a write operation on the disk image 300 is completed in the first OS 110, the electronic device 1000 may change usage authority of the first OS 110 as read-only authority, and change usage authority of the second OS 120 as writable authority.

In operation S423, the electronic device 1000 may mount the disk image 300 to the second OS 110 when the usage authority of the second OS 120 is determined.

In an example embodiment, when a write operation is tried on the disk image 300 in the second OS 120 which has read-only authority on the disk image 300, the electronic device 1000 may pop up a notification 123 indicating a user has only read-only authority.

The notification 123 may include usage status of the disk image 300 in the first OS 110. For example, referring to FIG. 10B, the notification 123 may say "Copying files to the disk image 300 in the first OS 110." In an example embodiment, the notification 123 may further include information regarding progress of a write operation of the disk image 300 in the first OS 110.

The notification 123 may ask a user to select an option of forced-unmounting the disk image 300 from the first OS 110 or an option of changing usage authority. Therefore, a write operation on the disk image 300 may be performed in an OS 110, 120, or 130.

Therefore, the electronic device 1000 may allow OSs to have different authority on the disk image 300 at the same time. For example, the electronic device 1000 may allow a focus OS to have writable authority on the disk image 300 and a background OS to have read-only authority. Here, the focus OS is an OS in which focus is located, and the background OS is an OS in which focus is not located. Usage authority on the disk image 300 of each OS 110, 120, or 130 may depend on focus switching.

Figure 11:
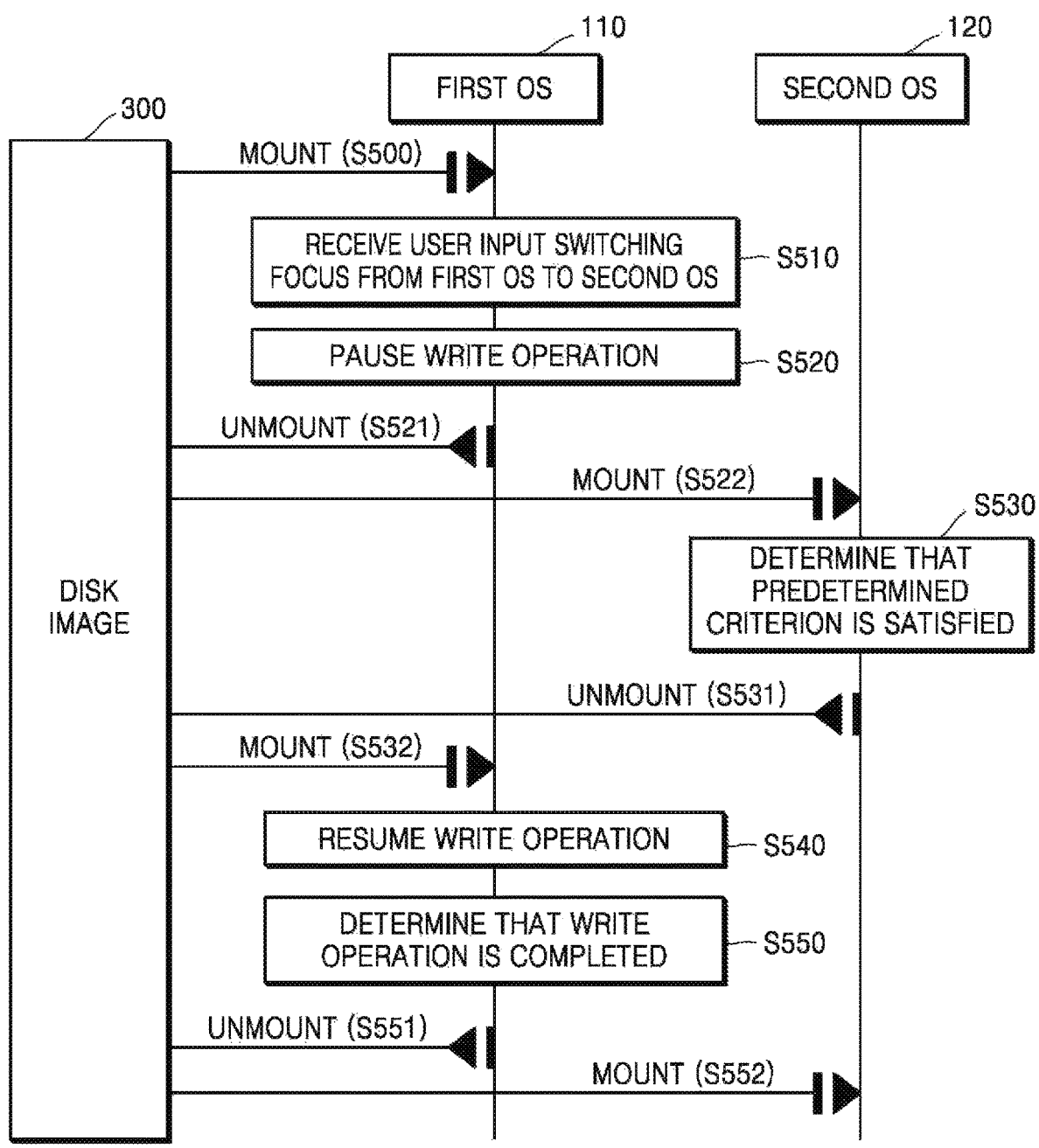
FIG. 11 illustrates a flowchart of a method of sharing a disk image between a plurality of OSs in an electronic device, according to an example embodiment.

FIG. 11 illustrates a flowchart of a method of sharing a disk image between a plurality of OSs according to an example embodiment.

An explanation with respect to operations S100 and S110 may be applied to operations S500 and S510, thus redundant explanation is omitted. It is assumed that a write operation is performed on the disk image 300 in the first OS 110 in FIG. 11.

In operation S520, the electronic device 1000 may pause the write operation on the disk image 300 in the first OS 110 in response to receiving a user input switching focus from the first OS 110 to the second OS 120 in operation S510.

For example, the write operation on the disk image 300 of the first OS 110 may be storing data in the disk image 300.

The write operation may consist of "request of write", "allocation of space requested", and "writing data on the disk image."

A write operation which is paused in the first OS 110 may be "allocation of space requested", and "writing data on the disk image." "Request of write" may be performed in the first OS 110, but "allocation of space requested", and "writing data on the disk image" are delayed and standby until resumed.

After "request of write" is performed in the first OS 110, a response from the first OS 110 to the electronic device 1000 may be delayed. Accordingly, the write operation is not stopped since an error response is not received at the electronic device 1000 after the disk image 300 is unmounted from the first OS 110. Write operation is not stopped, and the disk image 300 may be remounted to the first OS 110 to resume the paused write operation.

In an example embodiment, the electronic device 1000 may pause a write operation on the disk image 300 in the first OS 110 according to a predetermined criterion. The predetermined criteria for mounting the disk image 300, which has been mounted to the first OS 110, to the second OS 120 may vary according to an embodiment.

In operation S521, the electronic device 1000 may unmount the disk image 300 from a first OS 110.

Even the disk image 300 is unmounted from the first OS 110, a write operation on the disk image 300 is not stopped but only paused, the first OS 110 may resume the paused write operation when the disk image 300 is remounted to the first OS 110. It may be convenient for users.

In operation S522, the electronic device 1000 may mount the disk image 300 to the first OS 120.

The second OS 120 may read data stored in the mounted disk image 300 or store data to the mounted disk image 300 as the first OS 110 does. The second OS 120 may use data stored by the first OS 110, thus, data may be shared between the first OS 110 and the second OS 120 conveniently.

In operation S530, the electronic device 1000 may unmount the disk image from the second OS 120 and remount the disk image to the first OS based on a predetermined criterion.

The predetermined criteria may be usage status on the disk image 300 of the second OS 120. For example, a write or read operation is not performed on the disk image 300 in the second OS 120, the electronic device 1000 may remount the disk image 300, which has been mounted to the second OS 120, to the first OS 110

The predetermined criteria may be a input pattern in the second OS 120. For example, even after the focus is switched from the first OS 110 to the second OS 120, when the electronic device 1000 is not controlled over a certain time period, when a user controls the electronic device regardless of reading/read operation, or when idle time exceeds a certain value, the electronic device 1000 may remount the disk image 300 to the first OS 110.

The predetermined criteria may be workload on the disk image 300 of the first OS 110 and the second OS 120. For example, workload of the disk image 300 in the first OS 110 is greater than workload of the disk image 300 in the second OS 110, the electronic device 1000 may remount the disk image 300, which has been mounted to the second OS, to the first OS 120. According to an example embodiment, an operation with larger workload may be completed first, resources of the electronic device 1000 may be efficiently used.

In operation S540, the electronic device 1000 may resume the write operation which has been paused in the first OS 110.

Therefore, a write operation may be resumed in a background OS while a user using a focus OS. According to an example embodiment, user experience where the disk image is simultaneously used in a plurality of 110, 120, and 130.

In operation S550, the electronic device 1000 may unmount the disk image 300 from the first OS 110 and mount the disk image 300 to the second OS 120.

The first OS 110 is a background OS which is not controlled by a user, the disk image 300 may not be mounted after resumed write operation is completed in the first OS 110. The electronic device 1000 may unmount the disk image 300 from the first OS 110 and mount the disk image 300 to the second OS 120 when the resumed write operation is completed. Therefore, the disk image 300 may be accessed in the second OS which is a focus OS quickly.

Figure 12:
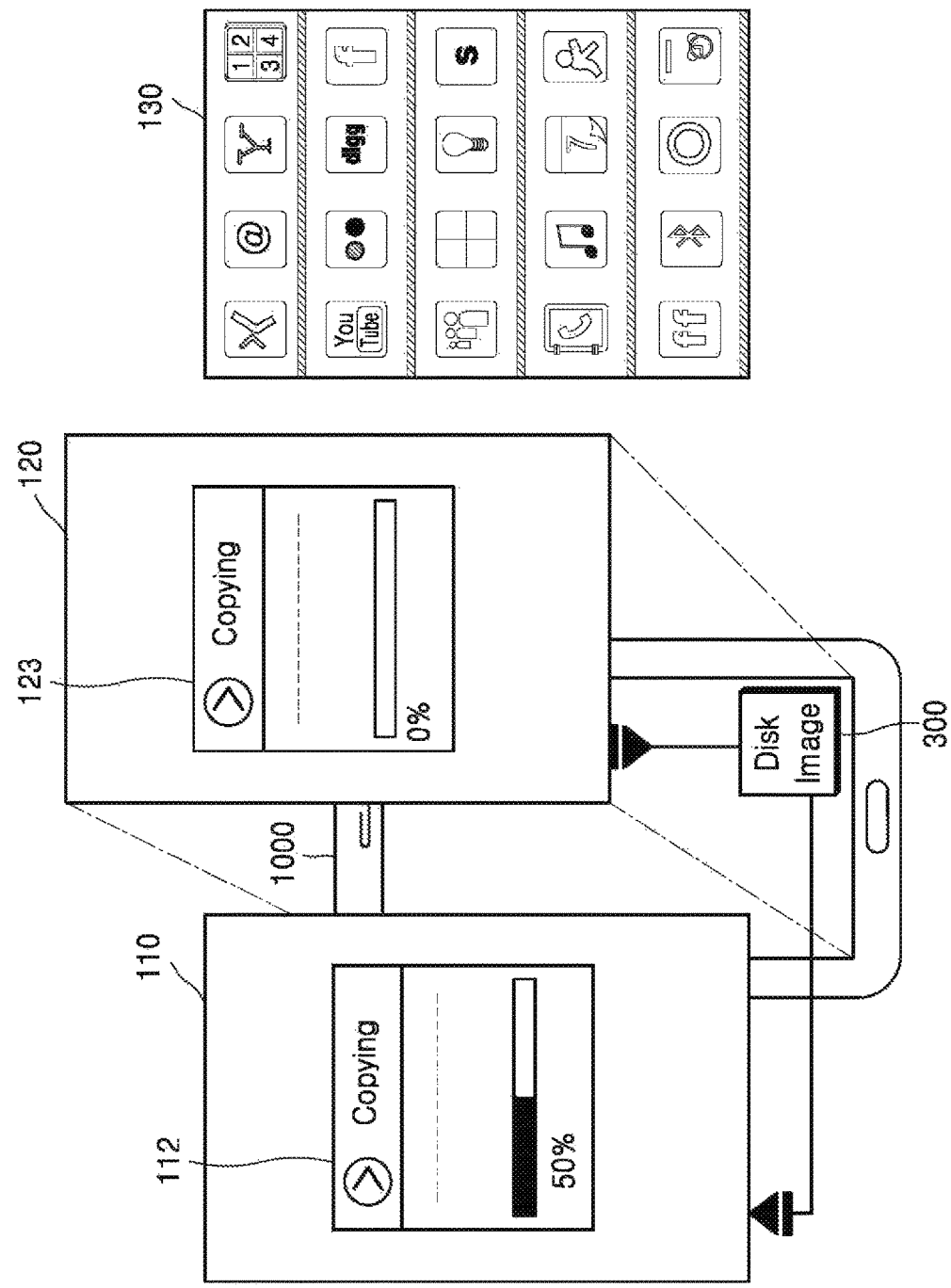
FIG. 12 is a schematic diagram illustrating mounting of a disk image in each OS in a time-sharing manner, according to an example embodiment.

FIG. 12 is a schematic diagram of mounting a disk image in each OS by a time-sharing way according to an example embodiment.

Figure 13A:
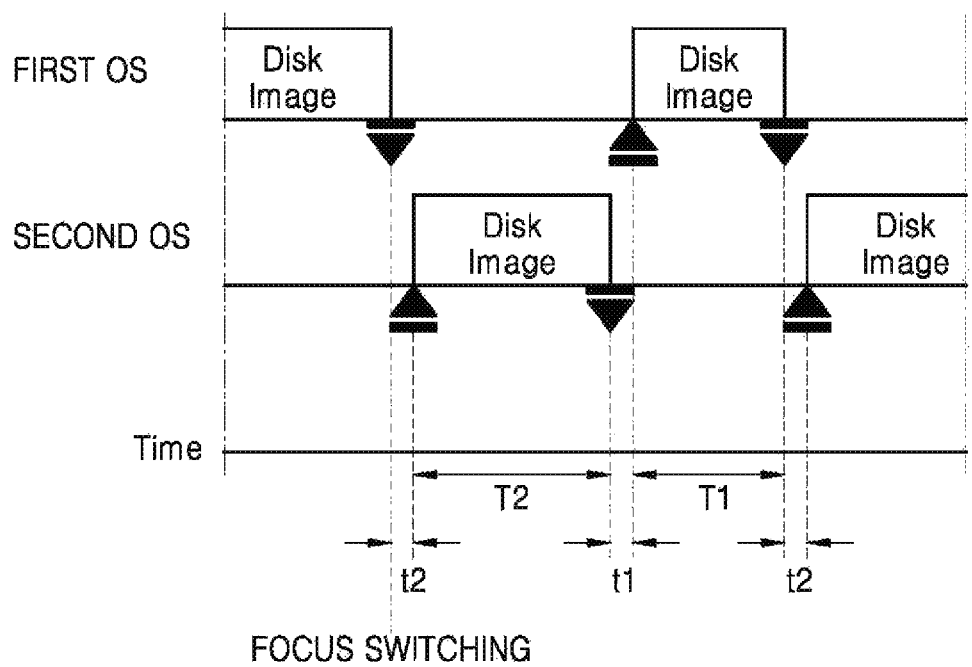
FIGS. 13A and 13B are graphs for explaining a method of mounting a disk image in a time-sharing manner, according to an example embodiment.
Figure 13B:
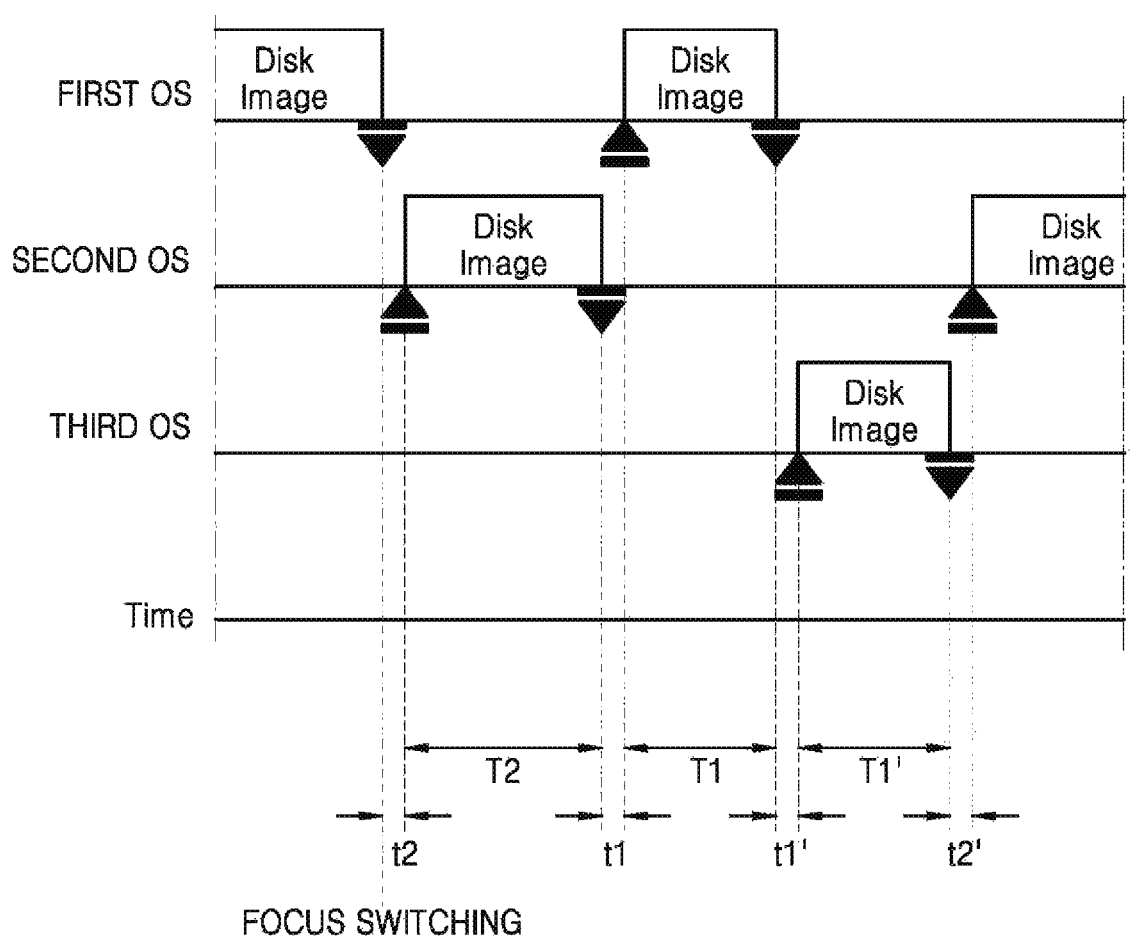

An explanation of the flowchart is further refereed to FIGS. 13A and 13B.

FIGS. 13A and 13B are graphs for explaining a method of mounting a disk image in a time-sharing way according to an example embodiment. Referring to FIG. 13A, the disk image 300 may be mounted to two OSs in a time-sharing way. Referring to FIG. 13B, the disk image 300 may be mounted to three OSs in a time-sharing way. Referring to FIGS. 12, 13A, and 13B, the electronic device 1000 may unmount the disk image 300 from the first OS 110 and mount the disk image to the second OS 120 in response to receiving a user input switching focus from the first OS 110 to the second OS 120. Focus is located in the second OS 120, so the second OS 120 is a focus OS, and the first OS 110 and the third OS 130 are background OSs.

As illustrated in FIG. 12, write operations on the disk image 300 may be started in the first OS 110 and the second OS 120. As the disk image 300 is mounted to the second OS 120, a write operation on the disk image 300 in the first OS 110 may be paused, and a write operation in the second OS 120 may continue.

When write operations on the disk image 300 are started in the first OS 110 and the second OS 120, the disk image may be mounted to the first OS 110 and the second OS 120 in a time-sharing way.

Mount of a disk image in a time-sharing way refers to mounting the disk image to a plurality of OSs alternately. For example, referring to FIG. 13A, the disk image 300 is mounted to the second OS 120 for a time period T2, and remounted to the first OS 110 for a time period T1 regardless of focus switching. The disk image 300 may be remounted to the first OS 110 for T1, and then remounted to the second OS 120. While the disk image 300 is mounted to the second OS 120 for T2, a write operation on the disk image 300 may continue in the second OS 120. While the disk image 300 is mounted to the first OS 120 for T1, a write operation on the disk image 300 may continue in the first OS 110.

T1 and T2 may be different from each other.

For example, the electronic device 1000 may allow a focus OS to have the disk image 300 mounted for a longer period than a background OS. That is, the disk image 300 may be mounted to the second OS 120 for a longer period than the first OS 110.

The electronic device 1000 may determine a time ratio of mounting the disk image 300 in the first OS 110 and the second OS 120 based on input pattern in the second OS 120.

For example, when the electronic device 1000 is not controlled over a certain time period, when a user controls the electronic device regardless of reading/read operation, or when idle time exceeds a certain value, the electronic device 1000 may increase T1 for the first OS 110 and decrease T2 for the second OS 120.

The disk image 300 is mounted to the first OS 110 and the second OS 120 in a time-sharing way, thus, the disk image 300 may be used efficiently in OSs.

When write operations on the disk image 300 are started in the first OS 110, the second OS 120, and the third OS 130, the disk image may be mounted to the first OS 110, the second OS 120 and the third OS 130, and in a time-sharing way.

For example, the disk image 300 is mounted to the second OS 120 for a time period T2, and remounted to the first OS 110 for a time period T1 regardless of focus switching. The disk image 300 may be remounted to the first OS 110 for T1, and then mounted to the third OS 130 for T1'. An write operation continues in an OS to which the disk image 300 is mounted.

T1, T1' and T2 may be different from each other.

For example, the electronic device 1000 may allow a focus OS 120 to have the disk image 300 mounted for a longer period than background OSs 110 and 130. That is, the disk image 300 may be mounted to the second OS 120 for a longer period than the first OS 110 or the third OS 130.

The electronic device 1000 may determine a time ratio of mounting the disk image 300 in background OSs 110 and 130 based on workload on the disk image 300 of background OSs 110 and 130

For example, workload of the disk image 300 in the first OS 110 is greater than workload of the disk image 300 in the third OS 310, the electronic device 1000 may increase a ratio of T1 and decrease a ratio of T1'. Workload of local copy may be greater than workload of downloading via a network. According to an example embodiment, an operation with larger workload may be completed first in background OSs 110 and 130, resources of the electronic device 1000 may be efficiently used.

The electronic device 1000 may determine a time ratio of mounting the disk image 300 in the background OSs 110 and 130, and the focus OS 120 based on input pattern in the focus OS 120.

For example, when the electronic device 1000 is not controlled over a certain time period, when a user controls the electronic device regardless of reading/read operation, or when idle time exceeds a certain value, the electronic device 1000 may increase T1 for the background OSs 110 and 130 and decrease T2 for the task OS 120.

The disk image 300 is mounted to the first OS 110 and the second OS 120 in a time-sharing way, thus, the disk image 300 may be used efficiently in OSs.

While the disk image 300 is unmounted from a background OS 110 or 130, and mounted to a focus OS, time t2 may be consumed according to capability and characteristic of OSs 110, 120, and 130. While the disk image 300 is mounted to a background OS 110 or 130, time t1 or t1' may be consumed.

Figure 14A:
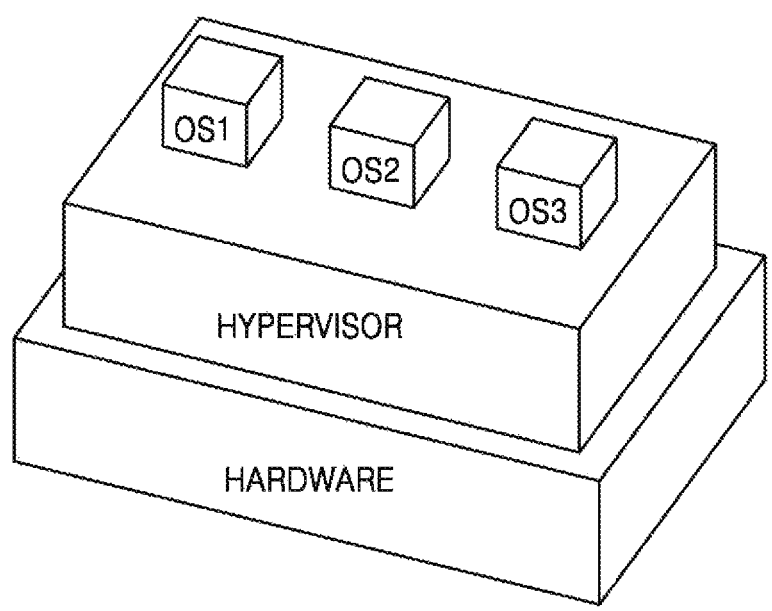
FIGS. 14A and 14B are schematic diagrams of a hypervisor according to an example embodiment.
Figure 14B:
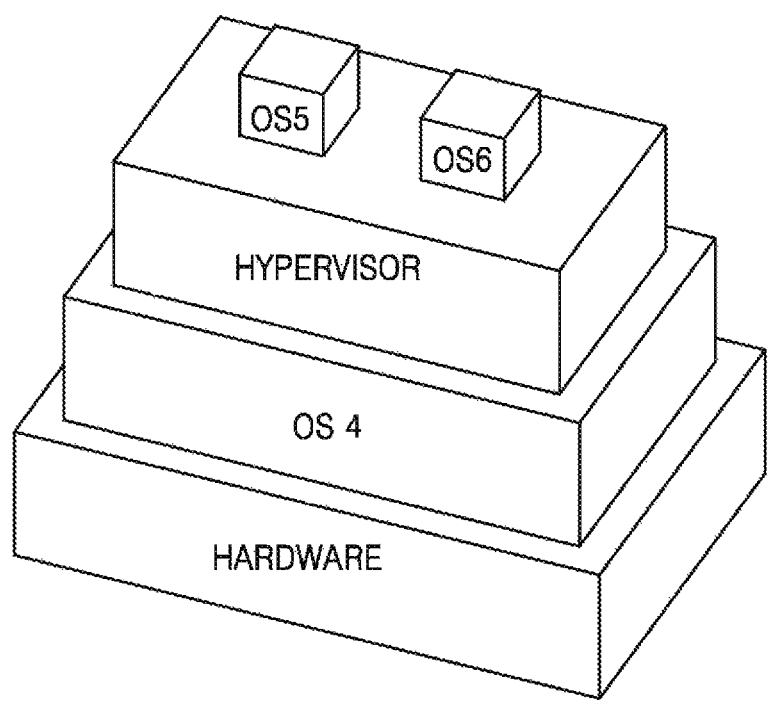

FIGS. 14A and 14B are schematic diagrams of a hypervisor according to an example embodiment.

Referring to FIGS. 14A and 14B, the electronic device 1000 may embodied as one hardware. One hardware may include every component included in the electronic device 1000. Hypervisor may be used to run a plurality of OSs on one hardware.

Above described embodiment may be embodied by hypervisor of FIGS. 14A and 14B.

Referring to FIG. 14A, hypervisor is executed in the first level on hardware, and guest OSs OS1, OS2, and OS3 are executed in the second level on the hardware. Hypervisor virtualizes resources of hardware, and a plurality of OSs OS1, OS2, and OS3 may share hardware resources via the hypervisor. The plurality of OSs OS1, OS2, and OS3 may operate virtual machines respectively.

Referring to 14B, a host OS OS4 is executed in the first level on hardware, and hypervisor may be installed and executed in the OS4. Guest OSs OS5, and OS6 may be executed in the third level on the hardware. Hypervisor virtualizes resources of hardware, and a plurality of OSs OS4, OS5, and OS6 may share hardware resources via the hypervisor. Guest OSs OS5 and OS6 may manage virtual machines respectively.

All references including publications, patent applications, and patents, cited herein, are hereby incorporated by reference to the same extent as if each reference were individually and specifically indicated to be incorporated by reference and were set forth in its entirety herein.

The exemplary embodiments are examples and are not to be construed as limiting, and the description of the exemplary embodiments is intended to be illustrative, and not to limit the scope of the claims, and many alternatives, modification, and variations will be apparent to those of ordinary skill in the art.

The exemplary embodiments may be represented using functional block components and various operations. Such functional blocks may be realized by any number of hardware and/or software components configured to perform specified functions. For example, the exemplary embodiments may employ various integrated circuit components, e.g., memory, processing elements, logic elements, look-up tables, and the like, which may carry out a variety of functions under control of at least one microprocessor or other control devices. As the elements of the exemplary embodiments are implemented using software programming or software elements, the exemplary embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the exemplary embodiments concept may employ related techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

The particular implementations shown and described herein are exemplary embodiments and are not intended to otherwise limit the exemplary embodiments in any way. For the sake of brevity, related electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless it is specifically described as "essential" or "critical."

The use of the terms "a", "an", and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations of all methods described herein can be performed in an appropriate order unless otherwise indicated herein or otherwise clearly contradicted by context. The exemplary embodiments are not limited by an order in which the operations are described herein. The use of any and all examples, or exemplary language (e.g., "such as") provided herein, is intended merely to clearly describe the exemplary embodiments and does not pose a limitation on the exemplary embodiments unless otherwise claimed. Numerous modifications and adaptations will be readily apparent to those of ordinary skill in this art without departing from the spirit and scope of the exemplary embodiments.

The invention claimed is:

1. An electronic device comprising:
a memory configured to store instructions; and
at least one processor configured to execute the instructions to:
receive a user input for switching focus from a first operating system (OS) to a second OS,
pause a writing operation on a disk image mounted in the first OS, and
mount to the second OS the disk image.

2. The electronic device of claim 1, wherein:
the at least one processor is further configured to execute the instructions to mount the disk image to the second OS in response to a user input for accessing the disk image in the second OS.

3. The electronic device of claim 1, wherein:
the disk image is mounted to the second OS after the writing operation is paused in the first OS.

4. The electronic device of claim 1, wherein:
the writing operation on the disk image in the first OS is resumed after remounting the disk image to the first OS from the second OS.

5. The electronic device of claim 4, wherein:
the at least one processor is further configured to execute the instructions to determine, based on a usage status of the disk image in the second OS, when to remount the disk image to the first OS.

6. The electronic device of claim 4, wherein:
the disk image is remounted to the first OS based on at least one of an input pattern in the second OS, a workload with respect to the disk image in the first OS, and a workload with respect to the disk image in the second OS.

7. The electronic device of claim 1, wherein:
the disk image is mounted to the first OS and the second OS in a time-sharing manner.

8. The electronic device of claim 1, wherein:
the at least one processor is further configured to pause, in response to the user input, the writing operation on the disk image in the first OS.

9. An electronic device comprising:
a memory configured to store instructions; and
at least one processor configured to execute the instructions to:
receive a user input for switching focus from a first operating system (OS) to a second OS,
determine to mount a disk image mounted to the first OS to the second OS based on a usage status of the disk image in the first OS, and
mount to the second OS the disk image.

10. The electronic device of claim 9, wherein:
the at least one processor is further configured to execute the instructions to delay mounting of the disk image in the second OS when the usage status of the disk image in the first OS indicates a writing operation.

11. The electronic device of claim 9, wherein:
the usage status is determined based on a data input/output (I/O) pattern of the disk image in the first OS, and
the data I/O pattern is determined based on at least one of read throughput and write throughput of the disk image in the first OS, and read frequency and write frequency of the disk image in the first OS.

12. The electronic device of claim 9, wherein:
the disk image is mounted to the first OS and the second OS in parallel.

13. The electronic device of claim 9, wherein:
usage authority of the disk image in the first OS and the second OS is determined based on the usage status of the disk image in the first OS.

14. The electronic device of claim 13, wherein:
usage authority of the disk image in the second OS is determined as writable authority when the usage status of the disk image in the first OS indicates a read operation, and
usage authority of the disk image in the second OS is determined as read-only authority when the usage status of the disk image in the first OS indicates a writing operation.

15. The electronic device of claim 9, wherein:
the at least one processor is further configured to determine when to mount the disk image to the second OS.

16. The electronic device of claim 9, wherein:
the at least one processor is further configured to delay the mounting of the disk image to the second OS.

17. The electronic device of claim 9, wherein:
the first OS has a first usage authority to access the disk image and the second OS has a second usage authority, different from the first usage authority, to access the disk image.

18. The electronic device of claim 17, wherein:
the first usage authority is read-only authority and the second usage authority is writable authority.

19. A method performed by an electronic device comprising at least one processor, the method comprising:
receiving, by the at least one processor, a user input for switching focus from a first operating system (OS) to a second OS;

pausing a writing operation on a disk image mounted in the first OS or determining to mount the disk image to the second OS based on a usage status of the disk image in the first OS, and mounting, by the at least one processor, to the second OS the disk image.

20. A non-transitory computer readable recording medium having recorded thereon instructions which, when executed by at least one processor, perform the method of claim 19.

* * * * *